Nov. 6, 1962  B. L. HAVENS ET AL  3,063,013
PULSE REPETITION RATE CONVERTER
Filed Dec. 18, 1959  14 Sheets-Sheet 1
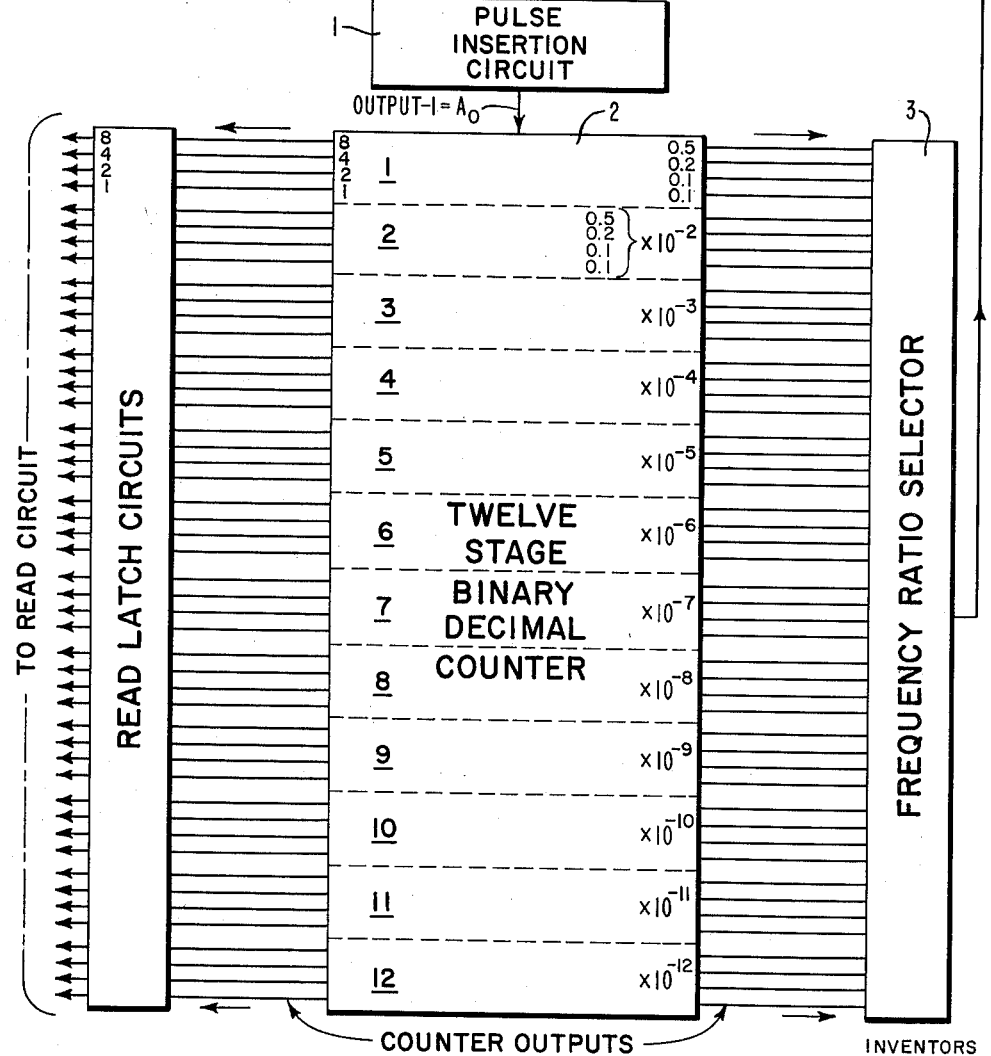
FIG. I Nov. 6, 1962  B. L. HAVENS ET AL  3,063,013
PULSE REPETITION RATE CONVERTER
Filed Dec. 18, 1959  14 Sheets-Sheet 2

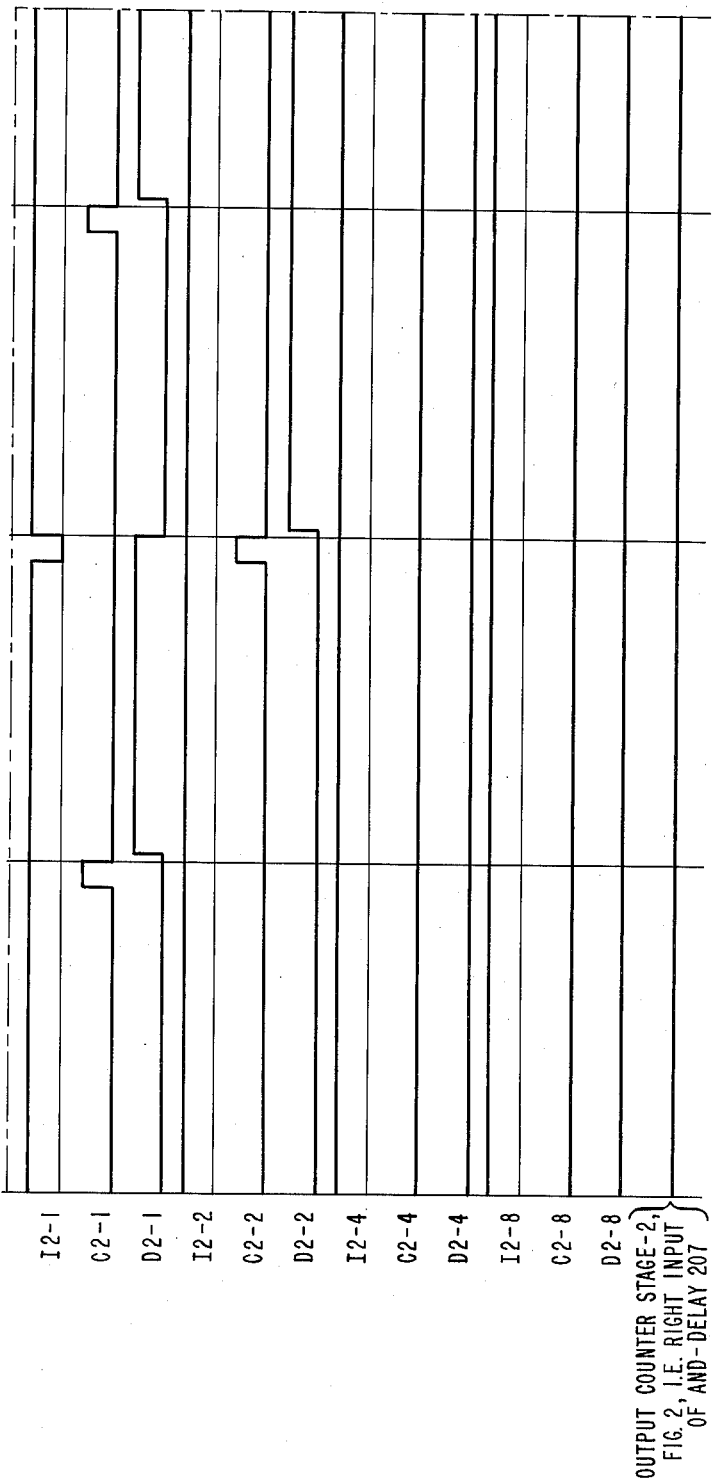

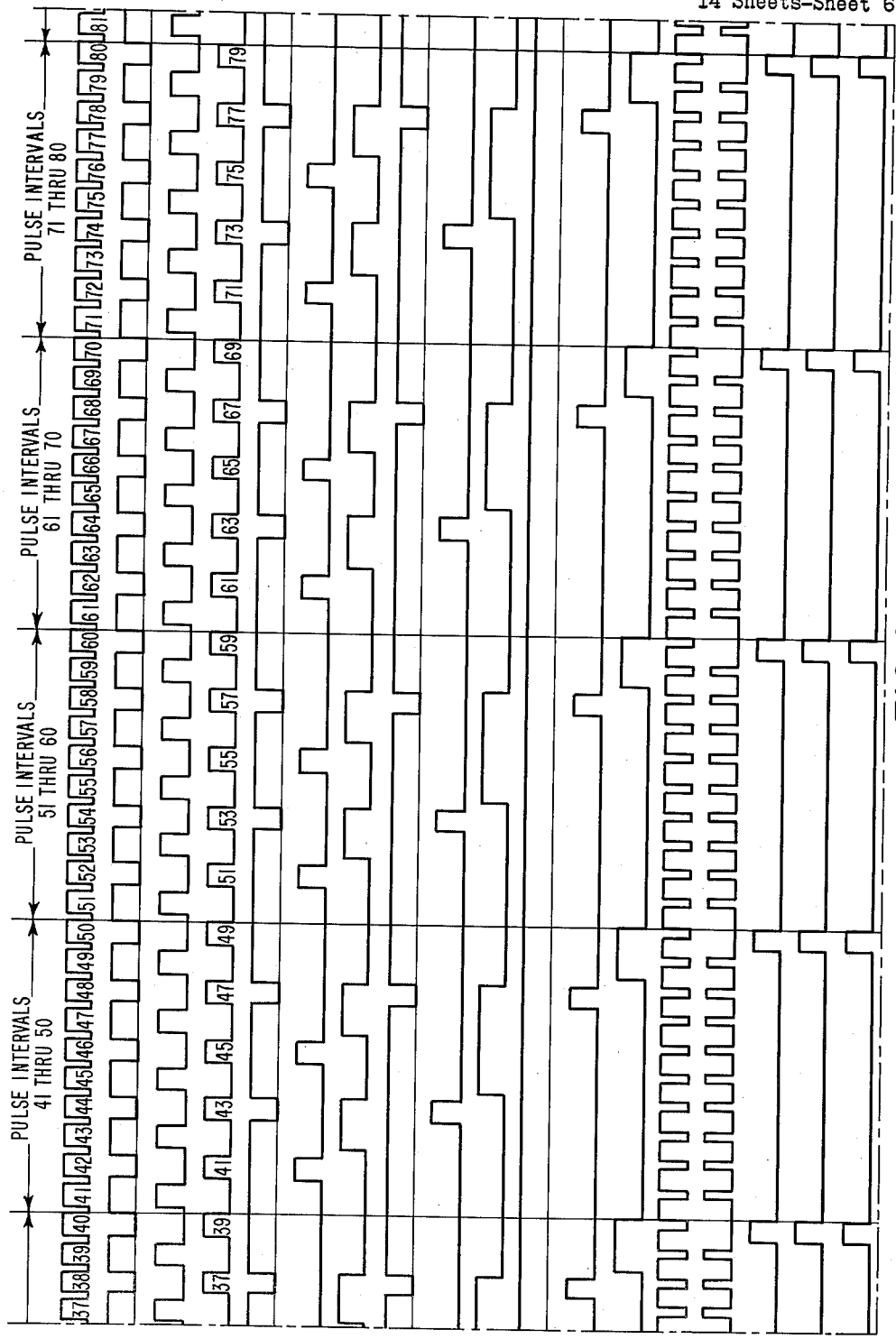

Nov. 6, 1962    B. L. HAVENS ET AL    3,063,013
PULSE REPETITION RATE CONVERTER
Filed Dec. 18, 1959    14 Sheets-Sheet 10

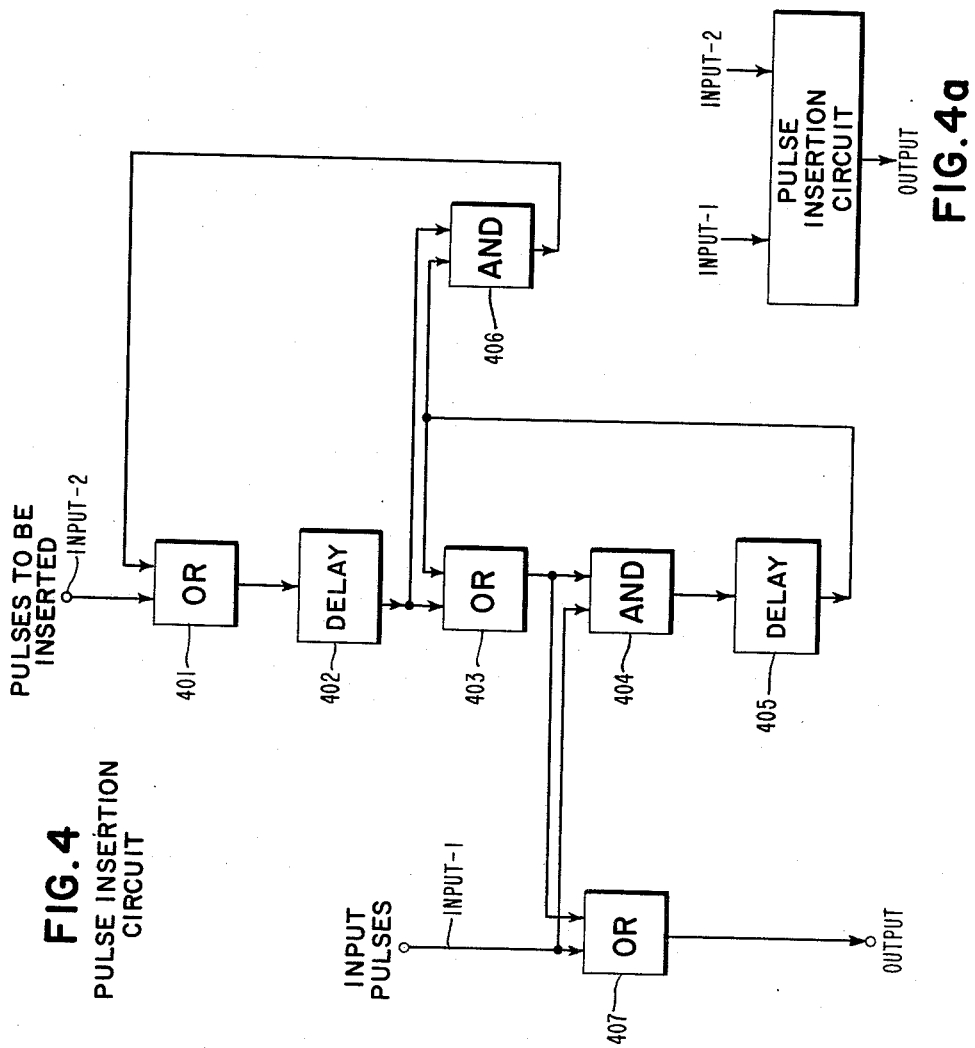
FIG. 4
PULSE INSERTION CIRCUIT
FIG. 4a
FIG. 5

United States Patent Office

3,063,013
Patented Nov. 6, 1962

3,063,013
PULSE REPETITION RATE CONVERTER
Byron L. Havens, Closter, N.J., and Merlin G. Smith, Yorktown Heights, N.Y., assignors to International Business Machines Corporation, New York, N.Y., a corporation of New York
Filed Dec. 18, 1959, Ser. No. 860,495
11 Claims. (Cl. 328—15)

This invention relates to pulse generators and more particularly to a pulse generator which renders an output of a desired number of pulses per second.

Invariant frequency generators having extremely high frequencies and a high degree of stability over long periods of time are known to the prior art. Such a generator may, for example be an ammonia oscillator having a frequency of approximately 23,870.14 m.c. which is substantially invariant over a long period of time. In the U.S. Patent 2,845,538 to the same inventors, there is shown a divider circuit for accepting the output of such an ammonia oscillator and dividing the output down to a much lower output frequency. The frequency divider circuit of that patent accepts the output frequency of the ammonia oscillator and, in turn, renders 971,278 pulses per second as the output of the frequency divider circuit.

There are many applications in whch it is desirable to convert a high frequency pulse train into a pulse train of a desired non-integral frequency of the high frequency pulse train. For example, in certain applications it is desirable to convert the 971,278 pulses per second output of the above-mentioned patent into a constant $1,000 \times 10^6$ pulses per second output. Such a constant one-megacycle pulse output would be quite useful as, for example, a source of clock pulses for a computer or data processing system operating on a one-megacycle time base.

Accordingly, it is an object of the present invention to provide a pulse generator which accepts a high frequency pulse train and renders as an output a pulse train of a desired, non-integral frequency of the input train.

It is a further object of the present invention to provide a pulse generator which converts a constant frequency source into a pulse train having a pulse output of a frequency slightly higher than the frequency of the source.

It is a further object of the present invention to provide a pulse generator which produces an output of a given number of pulses per period, which number may vary slightly from period to period but will be invariant when averaged over a large number of periods.

It is still a further object of the present invention to provide circuitry for accepting the output of a frequency divider and converting it into a source of one-megacycle pulses.

In accordance with the illustrated embodiment of the invention circuitry is provided for inserting a selected number of pulses into the 971,278 pulses per second pulse train of the above-identified patent so as to render an output at $1.000 \times 10^6$ pulses per second. As described in the patent the pulse train has a number of blank intervals such that the 971,278 pulses per second occur over $1.001 \times 10^6$ pulse intervals per second. That is, the pulse train is aperiodic so that each pulse interval does not contain a pulse therein.

A pulse insertion circuit is provided for inserting pulses into the blank pulse intervals of the 971,278 pulses per second train so as to render as an output $1.000 \times 10^6$ pulses per second. This pulse insertion circuit will store pulses and insert the pulses into the first blank pulse interval subsequent to the acceptance of a pulse for insertion.

This invention further provides a twelve-stage binary decimal counter for providing a plurality of pulse outputs of varying frequency, certain of which are selectively connected to the pulse insertion circuit for insertion in the aperiodic pulse train.

A constant frequency is fed into the twelve stage binary decimal counter so that each stage of the decimal counter will produce output frequencies of an integral multiple of the output frequency. In accordance with the illustrated embodiment a constant one megacycle pulse source is fed into the twelve stage binary decimal counter. The first stage divides this input frequency down and produces outputs of $5 \times 10^5$ pulses per second, $2 \times 10^5$ pulses per second and 2 outputs of $1 \times 10^5$ pulses per second. Similarly the second stage accepts the output of the first stage and produces pulse outputs of $5 \times 10^4$ pulses per second. $2 \times 10^4$ pulses per second and 2 outputs of $1 \times 10^4$ pulses per second. In the same manner, each stage of the binary decimal counter divides the output of previous stages down further so that the outputs of the twelve stages of the binary decimal counter provide a wide range of output frequencies.

A selected number of these pulse outputs of the twelve stage binary decimal counter are connected to the pulse insertion circuit so that the pulses of these outputs will be inserted into blank intervals in the 971,278 pulses per second pulse train. A frequency ratio selector circuit is provided for selectively connecting the pulse outputs of the twelve stage binary decimal counter to the pulse insertion circuit. Each pulse output of the twelve stage binary decimal counter is connected to a corresponding one of a plurality of single-pole, double-throw switches in the frequency ratio selector circuit. Each single-pole double-throw switch connects the pulses to either an insertion Or circuit when the switch is in one position or to a checking Or circuit when the switch is in the other position. The output of the insertion Or circuit is connected to the pulse insertion circuit so that all outputs of the twelve stage binary decimal counters which are connected through the single-pole, double-throw switches to the insertion Or circuit will be inserted into blank intervals in the 971,278 pulses per second pulse train. The checking Or circuit together with associated circuitry performs a constant check as to the accuracy of operation of this device.

A better understanding of the invention together with further objects and advantages thereof will be better understood from a consideration of the following description taken in connection with the drawings.

FIG. 1 shows a block diagram of the pulse generator of the invention;

FIG. 2c shows a composite of FIGS. 2d through 2i;

FIGS. 2d through 2i show waveforms depicting the operation of the twelve stage binary counter;

FIG. 4 shows the pulse insertion circuit of the invention;

FIG. 4a shows the pulse insertion circuit in block form with the interconnection between the pulse insertion circuit and the components of the block diagram of FIG. 1 shown;

FIG. 5 shows the frequency ratio selector in block form;

Referring particularly to FIG. 1 there is shown a block diagram of the pulse generator of the subject invention. A super high frequency divider of the type shown and described in patent U.S. No. 2,845,538 to the same inventors provides Input 1 to the subject circuit. This super high frequency divider is adapted to accept an output freqency of 23,870, 14 × 10⁶ cycles per second from an ammonia oscillator and render an output of 971,278 pulses per second contained in 1,001 × 10⁶ pulse intervals per second. The output of the super high frequency divider, designated $Y_0$, forms one input to a pulse insertion circuit 1. The output of the pulse insertion circuit, designated $A_0$, is the constant one megacycle pulse train.

This output of the pulse insertion circuit is connected to the twelve stage binary decimal counter 2. In order to provide a number of pulse outputs having frequencies of a multiple integral of the one megacycle per second pulse train input, the twelve stage binary decimal counter is connected to divide down the input frequency so that each stage produces outputs of successively lower multiple integral frequencies of the input frequency. These outputs are shown diagrammatically at the right of the twelve stage binary decimal counter.

Each of these outputs is connected to a frequency ratio selector 3. The frequency ratio selector 3 will produce an output of a number of pulses equal to approximately 1,000 × 10⁶—971,278 pulses per second in the embodiment shown. It should be understood, of course, that where the output of the super high frequency divider is other than 971,278 pulses per second as shown in the illustrated embodiment, the output of the frequency ratio selector will be equal to 1,000 × 10⁶ pulses per second minus the number of pulses per second contained in the pulse output of the super high frequency divider.

This output of the frequency ratio selector is connected to the pulse insertion circuit 1. The pulses contained in the output of the frequency ratio selector will be inserted into blank intervals in the 971,278 pulses per second aperiodic pulse train. The pulse insertion circuit 1 stores the pulses contained in the output of the frequency ratio selector until a blank interval occurs in the 971,278 pulses per second pulse train. At this time the pulses stored in the pulse insertion circuit 1 are inserted into the pulse train. The result is that a number of pulses are inserted into the pulse train sufficient to render the pulse train a constant 1,000 × 10⁶ pulses per second.

*12-Stage Binary Decimal Counter*

Figure 2A:
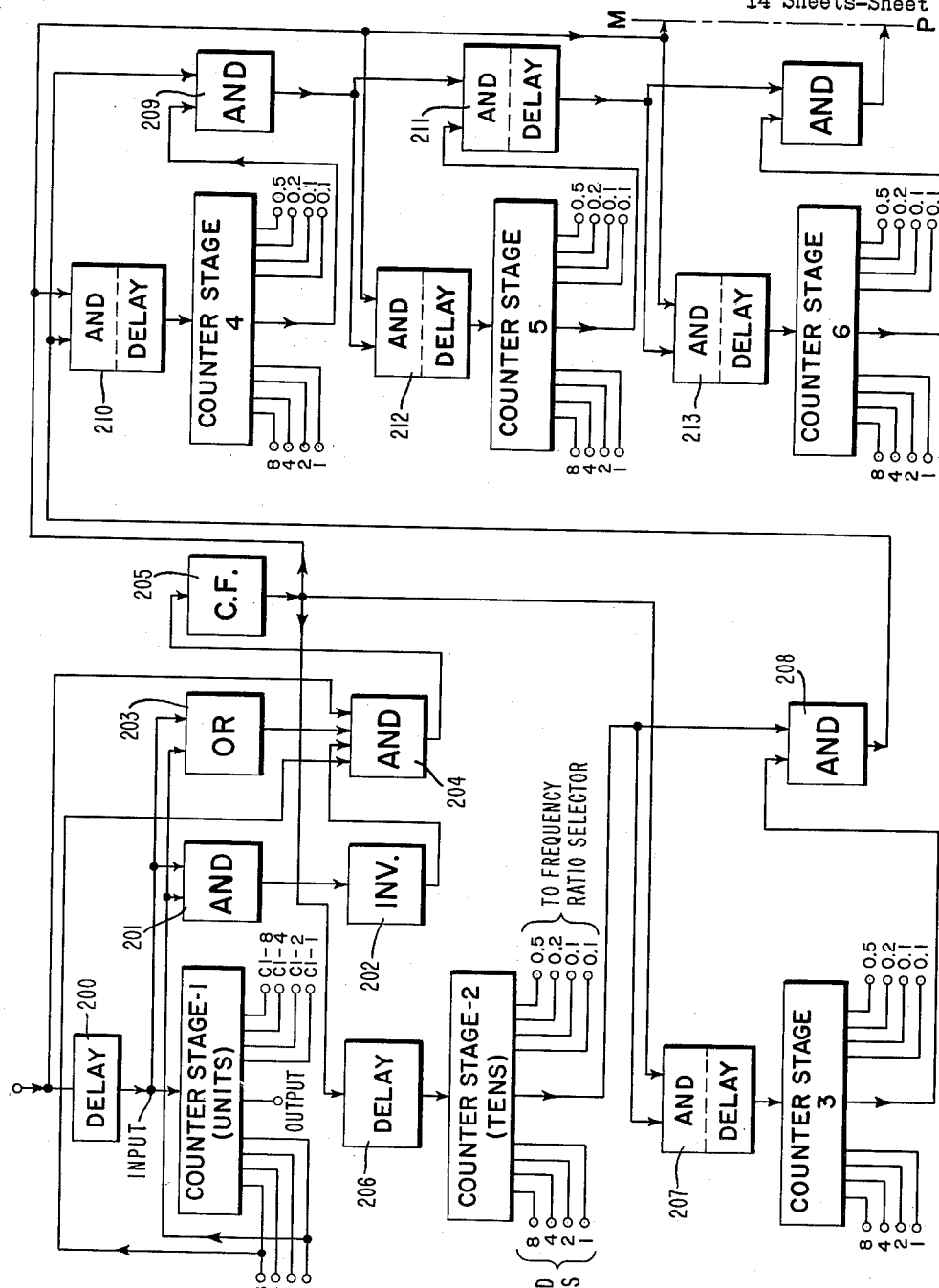
FIG. 2a shows a portion of the twelve stage binary counter of the invention.
Figure 2B:
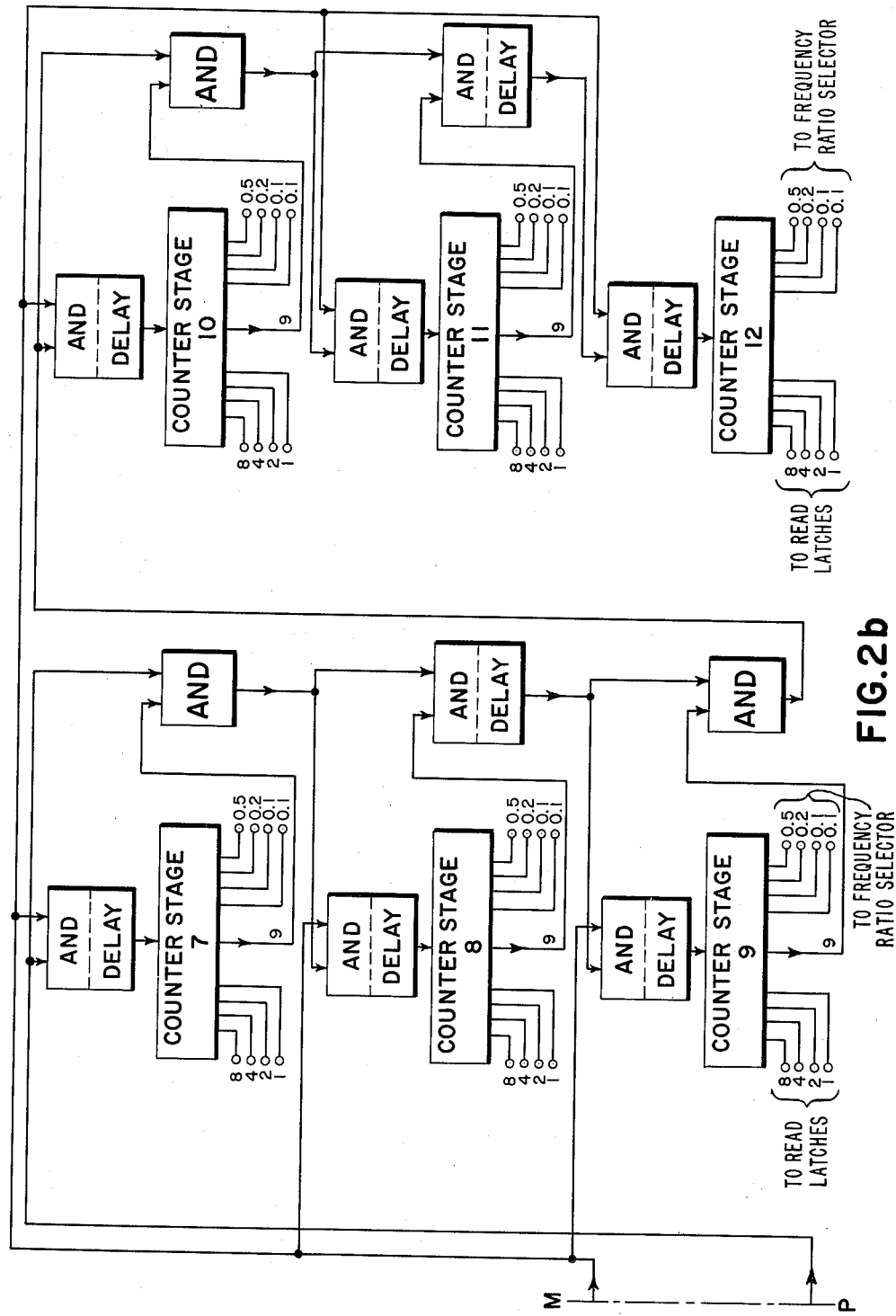
FIG. 2b shows the remainder of the twelve stage binary counter of the invention.

The details of the twelve stage binary decimal counter 2 will be described initially. Referring to FIGS. 2a and 2b it will be seen that there are 12 blocks respectively labelled, "Counter stage 1," "Counter stage 2," . . . "Counter stage 12." Each lower order counter stage is connected in series with the next succeeding higher order stage. Even though the interconnection between stages differs, each of these stages are substantially identical. Therefore, for purposes of explanation it is convenient to briefly point out the logic of a single counter stage as shown in FIG. 3.

Figures 3, 3A:
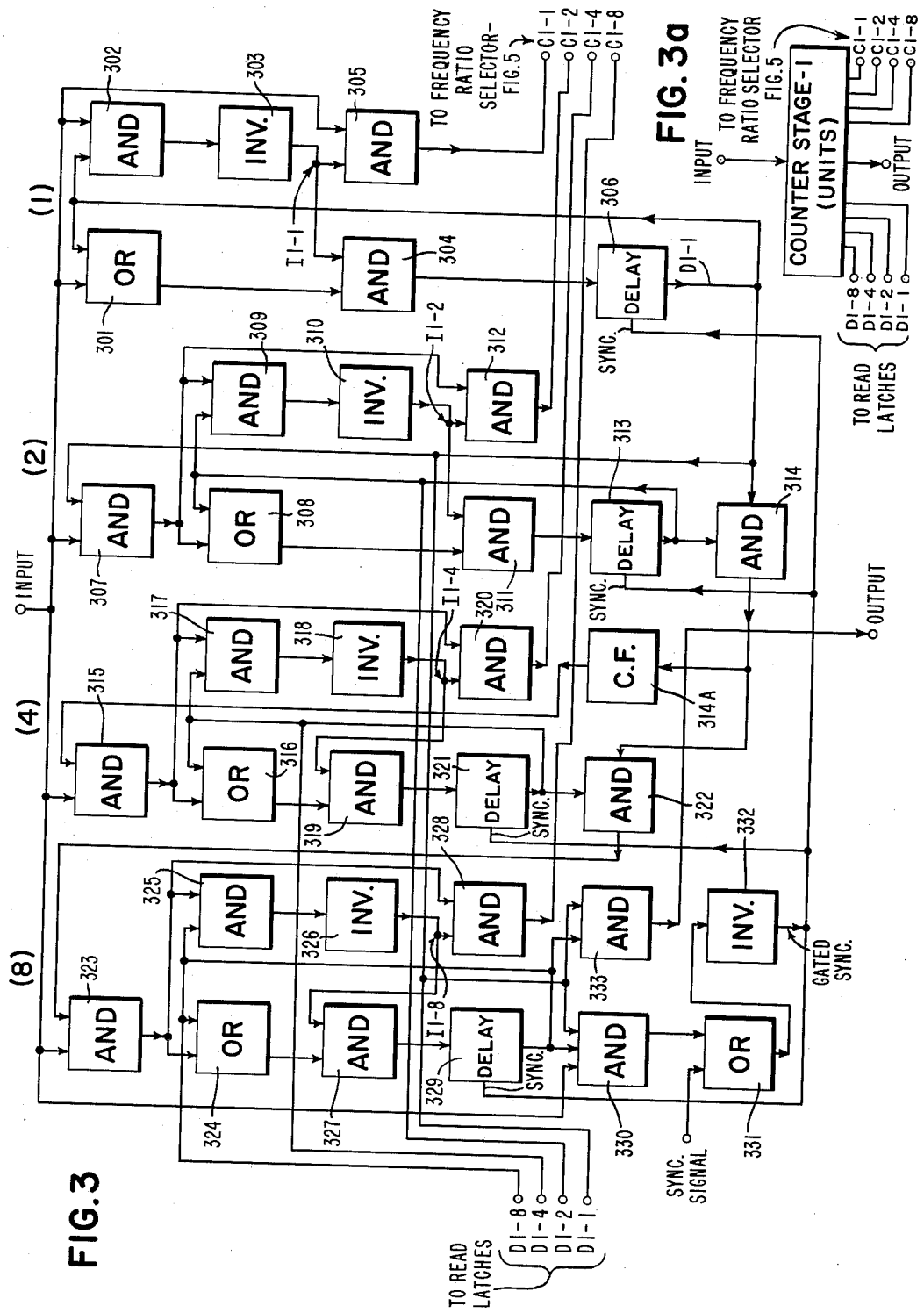
FIG. 3 shows in more detail one stage of the twelve stage binary decimal counter.
FIG. 3a shows one stage of the twelve stage binary decimal counter in block form with connections to other stages shown.

Referring to FIG. 3, it will be seen that the counter may be thought of as having a 1 bit portion, a 2 bit portion, a 4 bit portion and an 8 bit portion. The 1 bit portion includes a 1 bit latch consisting of OR circuit 301, AND circuit 304 and delay circuit 306 in addition to AND circuit 302, inverter 303 and AND circuit 305.

The 2 bit portion includes a 2 bit latch consisting of OR circuit 308, AND circuit 311, delay circuit 313 in addition to AND circuit 309, inverter 310 and AND circuit 312.

The 4 bit portion includes a 4 bit latch consisting of OR circuit 316, AND circuit 319 and delay circuit 321 in addition to AND circuit 317, inverter 318 and AND circuit 320.

The 8 bit portion includes an 8 bit latch consisting of OR circuit 324, AND circuit 327 and delay circuit 329 in addition to AND circuit 325, inverter 326 and AND circuit 328.

In order to gate pulses between the 1, 2, 4 and 8 bit latches referred to above there is provided an AND circuit 307 connected between the output of the 1 bit latch and the input to the 2 bit portion; AND circuits 314 and 315 connected between the outputs of the 1 and 2 bit portions and the 4 bit portion; and AND circuits 314, 322 and 323 connected between the output of the 1, 2 and 4 bit portions and the input of the 8 bit portion. In order to transmit an output from the counter stage when a count of 9 is stored in the counter, an AND circuit 333 is provided. Further, to reset the counter stage to zero upon the occurrence of the tenth input pulse, an AND circuit 330, OR circuit 331 and inverter circuit 332 are provided.

For the purpose of this description the outputs of inverter circuits 303, 310, 318 and 326 are respectively labelled terminals II–1, II–2, II–4 and II–8. The outputs of AND circuits 305, 312, 320 and 328 are respectively labelled terminals C1–1, C1–2, C1–4 and C1–8 and the outputs of delay circuits 306, 313, 321 are respectively labelled as terminals D1–1, D1–2, D1–4 and D1–8.

At this point, it is desirable to briefly describe the function and operation of a latch such as the 1, 2, 4 and 8 bit latches of the counter of FIG. 3. Since these latches are identical, it will suffice to explain the operation of the 1 bit latch.

Assume a single input pulse is impressed on the left-hand input of OR circuit 301 and that terminal II–1 is UP. The single pulse passes through OR circuit 301 and AND circuit 304 and is impressed upon delay circuit 306. The single pulse is delayed by one bit in the delay circuit 306 and is then impressed on the right-hand input of OR circuit 301 and the left-hand input of AND circuit 302. In the absence of a second input pulse, this pulse from the output of delay circuit 306 continues to circulate in the 1 bit latch. That is, the pulse from the output of delay circuit 306 again passes through OR circuit 301, and AND circuit 304 and is again delayed by delay circuit 306. When a pulse is recirculating in the latch in this manner, the latch may be thought of as being energized.

The latch will remain energized until the occurrence of a second input pulse. Upon the occurrence of the second input pulse, the output of AND circuit 302 goes UP and the output of inverter 303 (point II–1) goes DOWN for the duration of this second input pulse. Because of this, the pulse circulating in the 1 bit latch will fail to find coincidence at AND circuit 304 and this latch will be de-energized.

It can be seen that when the 1 bit latch is not energized, an input pulse to the 1 bit portion will be conveyed via AND circuit 305 to input terminal C1–1 by reason of the fact that the output of inverter 303 (point II–I) is UP. However, when the 1 bit latch is energized, a subsequent input pulse to the 1 bit portion will result in terminal II–I going DOWN for the duration of this pulse and precluding the rendition of a corresponding pulse at output terminal C1–1.

Further, from FIG. 3, it can be seen that in order for an input pulse to be impressed on the 2 bit portion of the counter, the right-hand input of AND circuit 307 must be UP. Since this input is connected to the output of delay circuit 306, it will only be UP during pulse intervals during which a pulse is circulating in the 1 bit latch, i.e., when the 1 bit latch is energized.

Correspondingly, for an input pulse to be impressed on the 4 bit portion of the counter of FIG. 3, the right-hand input of AND circuit 315 must be in the UP condition. This occurs when the output of AND circuit 314 is UP, and this occurs only when a pulse is recirculating in both the 1 and 2 bit latches, i.e., when these latches are both energized. The corresponding conditions will be seen to exist for the 8 bit portion of the counter of FIG. 3.

It is to be noted at this point that when only the 1 bit latch is energized, a count of 1 is stored in said counter. When only the 2 bit latch is energized, a count of 2 is stored in said counter. When the 1 and 2 bit latches are energized, a count of 3 is stored in said counter and correspondingly as to the remaining binary decimal combinations of 1, 2, 4 and 8 bit portions.

Now it will be apparent that since terminals D1–1, D1–2, D1–4 and D1–8 are respectively connected to the outputs of the 1, 2, 4 and 8 bit portions of the counter of FIG. 3, that these terminals will manifest by their UP and DOWN condition, the count standing in said counter.

The operation of the binary decimal counter stage shown in FIG. 3 will now be described with reference to the waveforms of FIGS. 2d through 2i which depict an example of operation of the counter stage. In the description of the operation of the counter stage shown in FIG. 3 reference is made to the waveforms of FIG. 2d wherein the waveform labelled input shows the input pulses to the system, the waveform labelled II–I represents the waveform at the terminal II–I of FIG. 3, the waveform labelled C–1 represents the waveform at the terminal C1–1 of FIG. 3 and so on.

Let it be assumed that the ten pulses opposite the label "Input of Counter Stage No. 1" occurring during pulse intervals 1 through 10, are impressed on the input terminal of the binary decimal counter of FIG. 3. From FIG. 2d, it will be seen that an output pulse appears at terminal C1–1 during pulse interval 1. This pulse results from the fact that the output (terminal II–I) of inverter 303 is UP during the first pulse interval. Hence, the first input pulse to the counter stage of FIG. 3 is transmitted via AND circuit 305 and results in an output pulse at terminal C1–1. This first input pulse to the counter of FIG. 3 is effective in energizing the latch consisting of OR circuit 301, AND circuit 304 and delay circuit 306. Because of this, terminal D1–1 will manifest a pulse during pulse interval 2. This pulse renders the left-hand input of AND circuit 302 UP during pulse interval 2 and therefore the second input pulse to the counter is effective via AND circuit 302 and inverter 301 is de-energizing the 1 bit latch and precluding the passage of the said second input pulse via AND circuit 305 to terminal C1–1.

Because of the connection between terminal D1–1 and the right-hand input of AND circuit 307, and because of the pulse at D1–1 during the pulse interval 2, the second input pulse is effective via AND circuit 307 in energizing the 2 bit latch consisting of OR circuit 308, AND circuit 311 and delay circuit 313. Thus during pulse interval 3 of FIG. 2D, terminal D1–2 (FIG. 3) has a pulse thereat which is the output of the 2 bit latch. It will also be seen that the second input pulse is conveyed via AND circuit 307 and AND circuit 312 to terminal C1–2. Thus during pulse interval 2 a pulse appears at terminal C1–2.

The third pulse, occurring during the third pulse interval is effective in rendering an output pulse at terminal C1–1 and energizing the 1 bit latch. This third input pulse to the counter of FIG. 3 does not effect the bit latch since the right-hand input of AND circuit 307, i.e. output of delay circuit 306, is DOWN during pulse interval 3.

Thus, at the beginning of the fourth pulse interval the 1 and 2 bit latches are both energized. The fourth input pulse is effective in de-energizing these latches, rendering an output pulse via AND circuits 315 and 320 at output terminal C1–4. The fourth input pulse also energizes the 4 bit latch resulting in terminal D1–4, the output of delay circuit 321, being UP during pulse interval 5.

The fifth input pulse to the counter of FIG. 3 will be effective in energizing the 1 bit latch and producing an output pulse at terminal C1–1 during pulse interval 5.

The sixth input pulse will be effective in de-energizing the 1 bit latch and energizing the 2 bit latch. In addition, an output pulse will appear at terminal C1–2 during the sixth pulse interval.

The seventh input pulse will be effective in energizing the 1 bit latch and producing an output pulse at terminal C1–1 during pulse interval 7.

The eighth input pulse is effective in energizing the 8 bit latch and de-energizing the 1, 2 and 4 bit latches. Further, the eighth input pulse results in an output pulse at terminal C1–8.

The ninth input pulse will be effective in energizing the 1 bit latch and rendering an output pulse at terminal C1–1.

Upon the occurrence of the tenth pulse interval the output of AND gate 333 will render an output which is the output of the counter stage of FIG. 3. The terminals D1–1 and D1–8 are connected to the right and left hand inputs of AND gate 333 respectively. As can be seen from the waveforms of FIG. 2d the terminals D1–1 and D1–8 are simultaneously UP only during the tenth pulse interval. Thus, the output of this stage, connected to the output AND gate 333, will render a pulse output during the tenth pulse interval. It is to be noted that a pulse will appear on the output during the tenth pulse interval whether or not there is an input pulse during this interval.

During the tenth pulse interval the counter stage of FIG. 3 will also be reset. This resetting is carried out by AND circuit 330, OR circuit 331 and inverter circuit 332 in conjunction with a source of sync signals which are connected to the OR circuit 331. These sync pulses occur at a 1 megacycle rate and may be derived, for example, from the same source as the source of sync pulses used in the Super High Frequency Divider of the above-mentioned patent. The operation of the counter stage of FIG. 3 during this resetting will now be explained.

Referring to the circuit of FIG. 3 and the waveforms of FIGS. 2d–2i, it will be seen that the periodic sync pulses are impressed on the left-hand input terminal of OR circuit 331. In the absence of an output pulse from AND circuit 330 being impressed on the right-hand input of OR circuit 331, the output of the inverter circuit 332 is the sync pulses inverted. The sync pulses are shown in timed relationship in FIG. 2 to the input pulse and blank pulse intervals impressed on the input of counter 3. Further, the output of inverter 332 taking cognizance of reset pulses from AND circuit 330, is shown in FIG. 2 for the illustrative series of input pulses to the counter of FIG. 3.

Figure 2D:
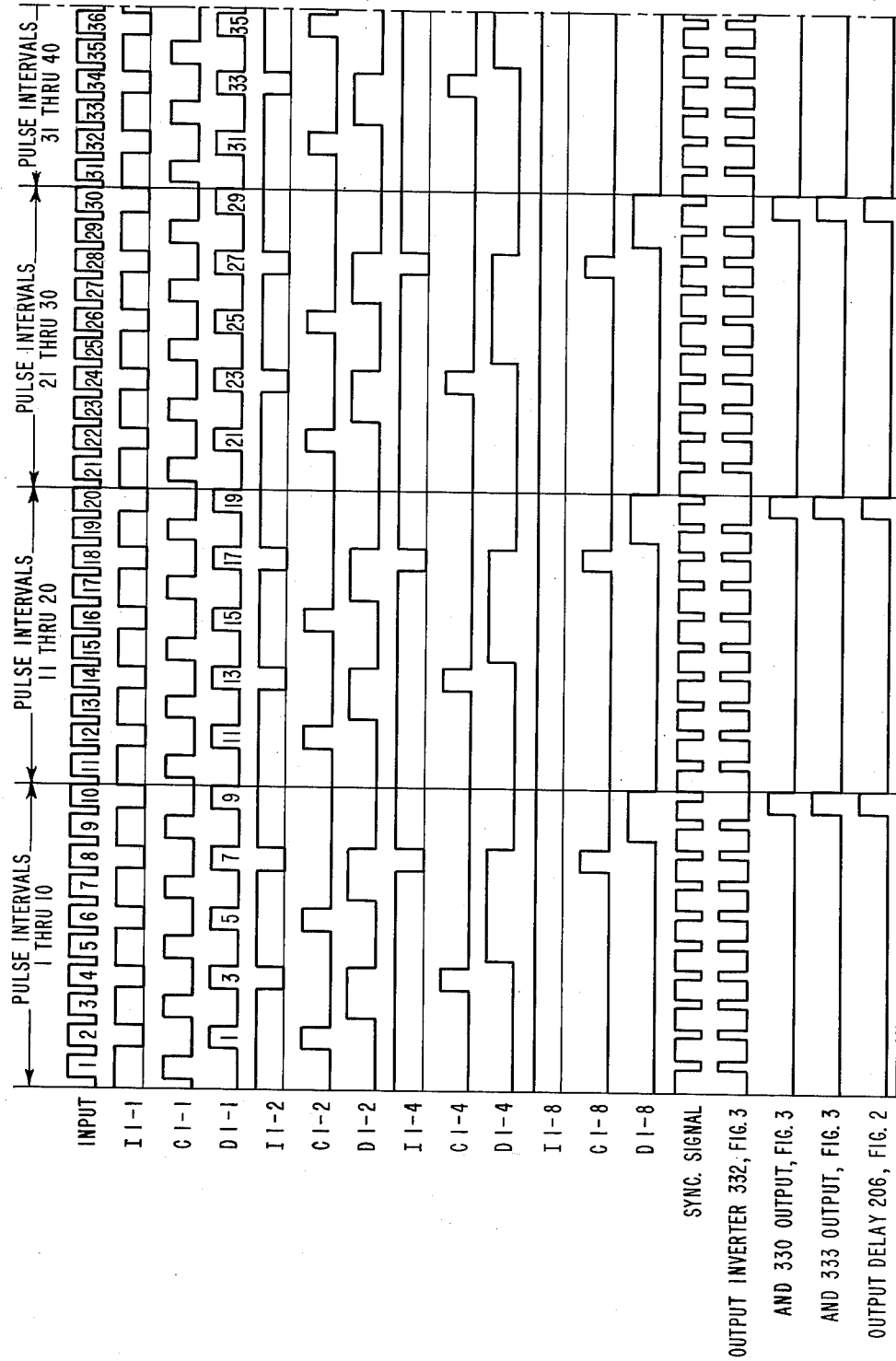

Referring to FIG. 3, it will be seen that the center and right-hand inputs of AND circuit 330 are respectively connected to the 8 bit latch and the 1 bit latch of the counter of FIG. 3. The left-hand input of AND circuit 330 is connected to the input of the counterstage. Thus it will be apparent that when a count of 9 is stored in the counter of FIG. 3, the center and right-hand inputs of AND circuit 330 will be UP and the tenth input pulse to said counter will result in an output pulse from AND circuit 330. This output pulse from AND circuit 330 is positive and dominates the sync signal occurring during the same time interval so that the output of inverter 332 will be DOWN throughout the entire tenth pulse interval as seen in FIG. 2d. The absence of a sync pulse during a tenth pulse interval, or more accurately during every tenth input pulse to the counter stage, results in a reset condition from inverter 332 being impressed respectively on the delay circuits of the 1, 2, 4 and 8 bit latches. This reset condition is effective in precluding these latches from being energized during the pulse interval in which the tenth input pulse to that counter stage is impressed on the input thereof thus resetting all of the latches of the counter stage.

Figure 2F:
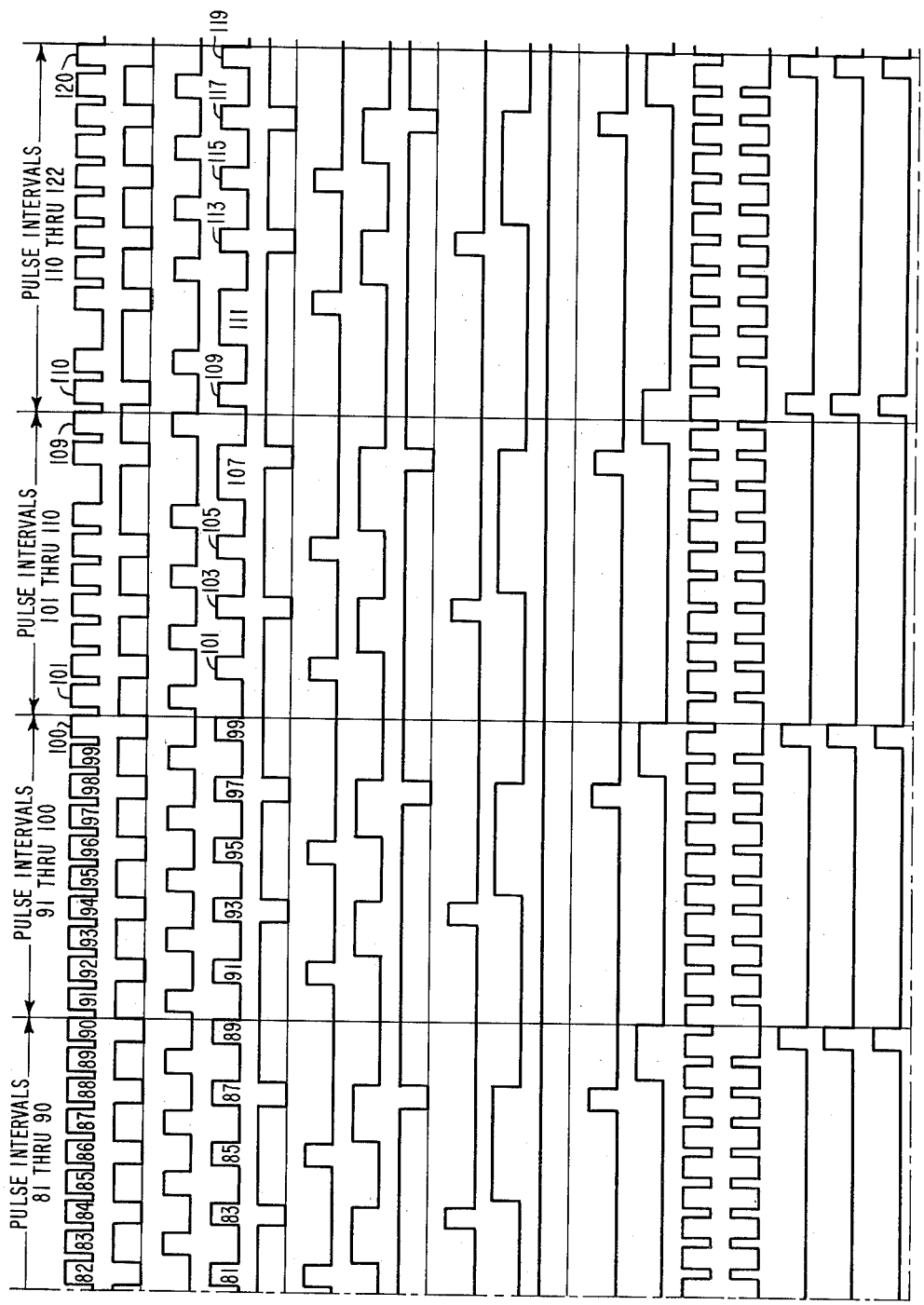
Figure 2I:
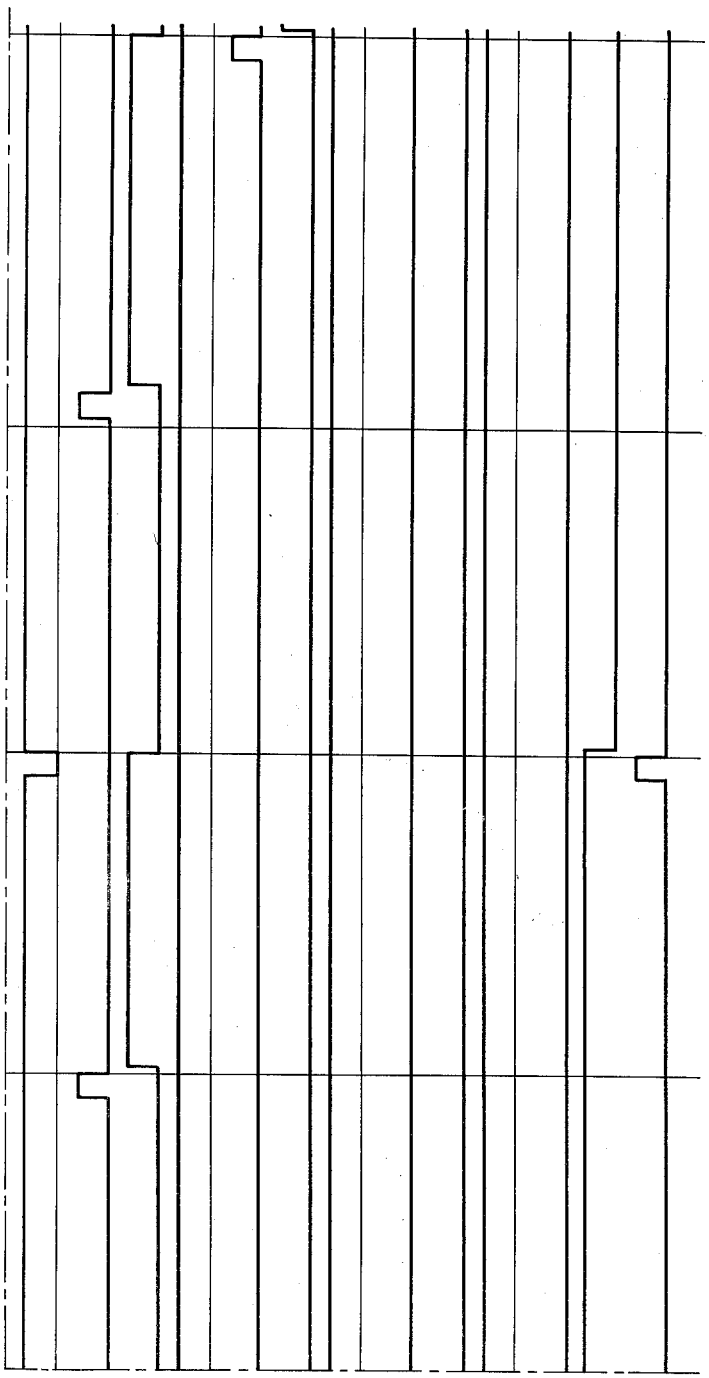
Figure 2H:
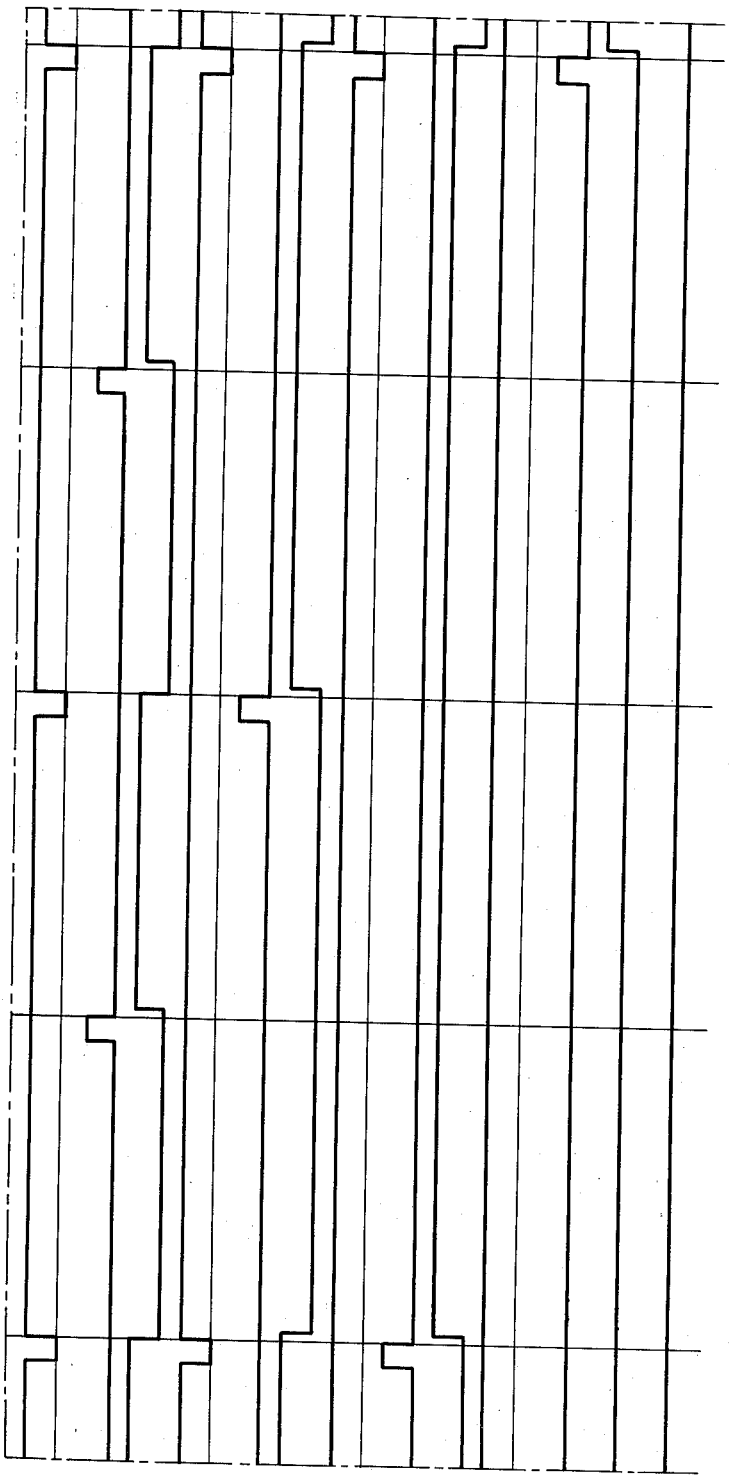

Referring to FIGS. 2d, 2e and 2f, it will be seen from the waveform labelled "Output of Inverter 332" that a reset condition occurs during pulse intervals 10, 20, 30, 40, 50, 60, 70, 80, 90, 100, 111 and 122. Further, as will appear more clearly hereinafter, counter stages 2 through 12 are respectively reset in like manner upon the tenth input pulse to the respective stages thereof.

Referring to FIGS. 2a and 2b, the circuitry interconnecting the various counter stages will now be described. The input to the 12-stage binary decimal counter is applied to stage 1 through a delay circuit 200. This delay circuit 200 provides a one bit delay which is necessary to the timing of the gating circuitry which interconnects the various stages. It is to be noted that the waveform denoted as input in FIG. 2d is the output of the delay circuit 200. This is the same waveform that is put into the delay circuit 200 but it is merely delayed one bit in time.

The circuitry interconnecting the first stage with the second stage transfers a pulse to the second stage upon the occurrence of the tenth input pulse to the first counter stage regardless of the fact that there may be blank pulse intervals contained between some of the input pulses. In order to accomplish this we provide an AND circuit 201 the output of which is connected to an inverter 202. The output of the delay circuit 200 and terminal D1–1 are both connected to AND circuit 201 and to an OR circuit 203. The output of the OR circuit 203 is connected to the second right-hand input of an AND circuit 204. The input to the delay circuit 200 is connected to the right-hand input of the AND circuit 204, the terminal D1–1 is connected to the left-hand input of the AND circuit 204, and the output of the inverter 202 is connected to the second from the left-hand input of AND circuit 204. In order to insure that the output of AND circuit 204 maintains its waveform, the output of AND circuit 204 is connected to a cathode follower 205. The output of this cathode follower 205 is the output of stage 1 of the binary decimal counter.

The operation of the circuitry interconnecting stage 1 with stage 2 will now be described. During pulse interval 9 the counter stage 1 has stored therein a mount of eight. Similarly, during pulse interval 10 counter stage 1 has stored therein a count of 9.

When a count of 8 is stored in the 1st stage, the left-hand input of AND circuit 204 will be UP. The ninth input pulse to counter stage 1 will be present at the output of delay circuit 200 and will result, through the medium of OR circuit 203, in the second from the right input of AND circuit 204 being UP. The tenth input pulse occurring during pulse interval 10 of FIG. 2d will be impressed on the right-hand input of AND circuit 204. The second from the left-hand input of AND circuit 204 will be UP since when a count of 8 standing in counter stage 1, the left-hand input of AND circuit 201 is DOWN and the output of inverter 202 is UP. Thus the output pulse appearing at the output of AND circuit 204 will be conveyed via cathode follower 205 and impressed on the input of delay circuit 206 and the right-hand input of AND delay circuit 207.

To briefly summarize, it is seen that the circuitry interconnecting counter stage 1 and counter stage 2 anticipates the arrival of the 10th input pulse. By sensing the count of 8 stored in the 8 bit latch of counter stage 1, the output of delay circuit 200, i.e., the 9th input pulse, and the input of delay circuit 200, i.e., the 10th input pulse, the circuitry interconnecting stage 1 and stage 2 will transfer a pulse to stage 2 upon the occurrence of the 10th input pulse. If, between the 8th and 9th input pulse to the counter stage 1, and/or between the 9th and 10th input pulses of counter stage 1, there is one or more blank pulse intervals, the circuit will still be effective in rendering an input pulse to counter stage 1 at the time the 10th input pulse appears at the input of delay circuit 200.

For purposes of explanation, let it be assumed that between the 9th and 10th input pulses of counter stage 1 a blank pulse interval occurs. Then when a count of 8 is stored in counter stage 1, the output of delay circuit 200 will be UP, whereas the input of said delay circuit will be DOWN because there is a blank pulse interval present thereat. This results in the right-hand input of AND circuit 204 being DOWN and thus no coincidence at said AND circuit. Thus the counter in its normal fashion will register a count of 9. However, with a count of 9 stored in counter stage 1, the left-hand input of AND circuit 204 will be UP, OR circuit 203 will be energized, resulting in the second from the right input of AND circuit 204 being UP, the blank pulse interval results in the output of delay circuit 200 being DOWN and thus the right-hand input of AND circuit 201 is DOWN causing, through the medium of inverter circuit 202, the second from the left input of AND circuit 204 being UP the tenth input pulse being impressed on the input of delay circuit 200 is also impressed on the right-hand input of AND circuit 204. Thus under the conditions of this example, when the 10th input pulse is impressed on the input of delay circuit 200, an output pulse is conveyed from AND circuit 204 via cathode followed 205 on the input of delay circuit 206 and the right-hand input of AND delay circuit 207.

Any sequence of pulse and blank pulse intervals will still result in counter stage 1 being reset every tenth input pulse and an input pulse to counter stage 2, upon every 10th pulse present at the input of delay circuit 200. Further, it is to be noted that counter stage 1 actually conveys a carry pulse to counter stage 2 when a count of 8 is stored therein and the occurrence of the 9th and 10th input pulses are present respectively at the output and input of delay circuit 200, or when a count of 9 is stored in counter stage 1 and the 10th input pulse to said stage is present at the input of delay circuit 200. This arrangement of anticipating a carry from counter stage 1 is employed to gain a pulse time interval in timing of the over-all counter of FIG. 2.

The output of the cathode follower 205 will produce a carry pulse for every other input pulse to counter stage 1. The output of the cathode follower 205 is applied to a delay circuit 206 in order to insert a pulse in the second stage upon the occurrence of carry pulse from stage 1.

In order to insert a pulse into counter stage 3 when stages 1 and 2 are full, AND delay circuit 307 is provided. The carry pulse from the cathode follower 205 is connected to the right-hand input of AND delay 207. The AND delay circuits, such as 207, are merely AND circuits in series with a delay circuit giving a one bit delay. The output of counter stage 2 is connected to the left-hand input of AND delay 207. When a count of 9 is stored in counter stage 2 the left-hand input to AND delay 207 will be UP. Thus, a carry pulse from the cathode follower 205 will be effective in inserting a pulse into counter stage 3.

The interconnection of AND delay circuits and AND circuits between the second through twelfth stages of the counter of FIG. 2 is such that the carry pulse, from the cathode follower 205, will be conveyed to the next higher order counter that has a count of less than 9 stored therein and in the event that there is a series of counter stages having a 9 stored therein between the first stage and the next higher order stage having a count less than 9, the intervening stages having the count of 9 stored therein will be reset.

In order to interconnect counter stage 4 with the preceding stages an AND circuit 208 and AND delay circuit 210 are provided. Similarly, AND circuit 209 and AND delay circuit 212 interconnect stage 4 with the preceding stages and AND circuit 211 and AND delay circuit 213 interconnect counter stage 6 with the preceding stages. Similar circuitry is provided for each of the remaining stages.

As an example of operation, let it be assumed that there is a carry from counter stage 1 and that counter stages 2 through 5 each have stored therein a count of 9, and that counter stage 6 has a count of less than 9 stored therein. The output of AND circuit 208 will be UP since its two inputs are respectively connected to the output of counter stages 2 and 3. With the output of AND circuit 208 UP, the right-hand input of AND circuit 209 is UP and the left-hand input of AND delay circuit 210 is UP. The left-hand input of AND circuit 209 is UP since the output of counter stage 4 is UP. Thus the output of AND circuit 209 is UP resulting in the left-hand input of AND delay circuit 212 being UP and the right-hand input of AND delay circuit 211 being UP. The left-hand input of AND delay circuit 211 is UP since the output of counter stage 5 is UP. Thus, the output of AND delay circuit 211 is UP and therefore the left-hand input of AND delay circuit 213 is UP.

To briefly summarize, the left-hand inputs of AND delay circuits 207, 210, 212 and 213 are UP. Upon the occurrence of a carry pulse at the output of cathode follower circuit 205 connected to the right-hand inputs of the above-mentioned AND delay circuits, a pulse will pass through these AND delay circuits. This pulse will reset stages 2, 3, 4 and 5 which previously had a count of 9 stored therein. A pulse will also be effective via AND delay circuit 213 to insert a pulse into counter stage 6 and advance that stage by one count. Counter stages 2 through 5 will respectively be reset to zero and the counter stage will be advanced one unit.

Referring to the waveforms of FIGS. 2c, it will be seen that during pulse intervals 1 through 100, output terminal C1-1 of counter stage 1 will have an output of fifty pulses. Correspondingly, output terminal C1-2 of counter stage 1 will have an output of twenty pulses displaced within pulse intervals 1 through 100 of FIG. 2c. Output terminals C1-4 and C1-8 of counter stage 1 will respectively have ten output pulses occurring during pulse intervals 1 through 100 of FIG. 2.

Now referring to pulse intervals 101 through 110 and intervals 111 through 122, it will be seen that the same ratio of input pulses to counter stage 1 to output terminals C1-1, C1-2, C1-4 and C1-8 respectively is maintained. Thus, it is apparent that the number of output pulses appearing at the afore-mentioned terminals, namely, C1-1 through C1-8 of counter stage 1 bears a constant ratio to the number of input pulses to the counter of FIG. 2 regardless of the occurrence of blank pulse intervals.

Briefly, for the units order terminals the following relations exist. For every two input pulses there will be an output pulse at terminal C1-1. For every ten input pulses there will be two output pulses at terminal C1-2. For every ten input pulses there will be one output pulse at terminal C1-4. For every ten input pulses there will be a single output pulse at terminal C1-8. Further, it will be seen from the waveforms of FIG. 2c and understood from the logical operation of the counter of FIG. 2, that during no pulse intervals will there be a pulse present at more than one of the following terminals of counter stage 1: C1-2, C1-4 and C1-8.

Still referring to FIGS. 2 and 2c, it will be appreciated that counter stage 2 will have present at output terminal C2-1, five output pulses at said terminal per ten input pulse to counter stage 2 or per 100 input pulse to counter stage 1; that output terminal C2-2 of counter stage 2 will have present thereat two output pulses per ten input pulses to counter stage 2, or per 100 input pulses to counter stage 1. Further, that output terminals C2-4 and C2-8 of counter stage 2 will have present thereat one output pulse per ten input pulses to counter stage 2, or per 100 input pulses to counter stage 1.

Referring to the waveforms opposite terminals C1-1 through C1-8 of counter stage 1 and the waveforms at terminals C2-1 through C2-8 of counter stage 2, all shown in FIG. 2c, it will now be seen that during no pulse interval is there an output pulse at more than one "C" output terminal of said two counter stages. Further, it could be shown that during no pulse interval is there an output pulse at more than one "C" terminal of the twelve counter stages shown in FIG. 2.

It will now be apparent that the counter stages 1 through 12 are effective in counting from 1 through $10^{12}$ pulses and that the "D" terminals of the twelve stages, if viewed during any pulse interval, would manifest the count in the complete counter of FIG. 2, whereas the total number of pulses occurring at the 48 "C" terminals of the counter of FIG. 2 will be equal in number, subject to a time delay in higher orders, to the number of input pulses impressed on the counter of FIG. 2. During no pulse interval will there be a pulse present at more than one "C" output terminals of the counter of FIG. 2. During certain pulse intervals corresponding to blank pulse intervals in the input impressed on the counter of FIG. 2, there will be no output pulse present at the "C" output terminals of the counter of FIG. 2. The constant relationship between pulses appearing at each of the "C" output terminals and the number of input pulses to the counter of FIG. 2 is set forth in Table 1.

TABLE 1

| Designated Output Terminals: | Ratio of Output Pulses At Designated Output Terminals to Input Pulses to 12 Stage Binary Decimal Counter |
|---|---|
| Counter Stage 1: | |
| C1-1 | $5 \times 10^{-1}$ |
| C1-2 | $2 \times 10^{-1}$ |
| C1-4 | $1 \times 10^{-1}$ |
| C1-8 | $1 \times 10^{-1}$ |
| Counter Stage 2: | |
| C2-1 | $5 \times 10^{-2}$ |
| C2-2 | $2 \times 10^{-2}$ |
| C2-4 | $1 \times 10^{-2}$ |
| C2-8 | $1 \times 10^{-2}$ |
| Counter Stage 3: | |
| C3-1 | $5 \times 10^{-3}$ |
| C3-2 | $2 \times 10^{-3}$ |
| C3-4 | $1 \times 10^{-3}$ |
| C3-8 | $1 \times 10^{-3}$ |
| Counter Stage 4: | |
| C4-1 | $5 \times 10^{-4}$ |
| C4-2 | $2 \times 10^{-4}$ |
| C4-4 | $1 \times 10^{-4}$ |
| C4-8 | $1 \times 10^{-4}$ |
| Counter Stage 5: | |
| C5-1 | $5 \times 10^{-5}$ |
| C5-2 | $2 \times 10^{-5}$ |
| C5-4 | $1 \times 10^{-5}$ |
| C5-8 | $1 \times 10^{-5}$ |
| Counter Stage 6: | |
| C6-1 | $5 \times 10^{-6}$ |
| C6-2 | $2 \times 10^{-6}$ |
| C6-4 | $1 \times 10^{-6}$ |
| C6-8 | $1 \times 10^{-6}$ |
| Counter Stage 7: | |
| C7-1 | $5 \times 10^{-7}$ |
| C7-2 | $2 \times 10^{-7}$ |
| C7-4 | $1 \times 10^{-7}$ |
| C7-8 | $1 \times 10^{-7}$ |
| Counter Stage 8: | |
| C8-1 | $5 \times 10^{-8}$ |
| C8-2 | $2 \times 10^{-8}$ |
| C8-4 | $1 \times 10^{-8}$ |
| C8-8 | $1 \times 10^{-8}$ |
| Counter Stage 9: | |
| C9-1 | $5 \times 10^{-9}$ |
| C9-2 | $2 \times 10^{-9}$ |
| C9-4 | $1 \times 10^{-9}$ |
| C9-8 | $1 \times 10^{-9}$ |
| Counter Stage 10: | |
| C10-1 | $5 \times 10^{-10}$ |
| C10-2 | $2 \times 10^{-10}$ |
| C10-4 | $1 \times 10^{-10}$ |
| C10-8 | $1 \times 10^{-10}$ |

| Designated Output Terminals: | Ratio of Output Pulses At Designated Output Terminals to Input Pulses to 12 Stage Binary Decimal Counter |
|---|---|
| Counter Stage 11: | |
| C11-1 | $5 \times 10^{-11}$ |
| C11-2 | $2 \times 10^{-11}$ |
| C11-4 | $1 \times 10^{-11}$ |
| C11-8 | $1 \times 10^{-11}$ |
| Counter Stage 12: | |
| C12-1 | $5 \times 10^{-12}$ |
| C12-2 | $2 \times 10^{-12}$ |
| C12-4 | $1 \times 10^{-12}$ |
| C12-8 | $1 \times 10^{-12}$ |
| C12-8 | $1 \times 10^{-12}$ |

Thus the binary decimal counter produces a number of pulse outputs having a wide range of multiple frequencies of the base frequency. These pulse outputs are connected to the frequency ratio selector so that certain of these outputs can be selected for connection to the pulse insertion circuit. The frequency ratio selector will now be described.

*Frequency Ratio Selector*

Figure 5A:
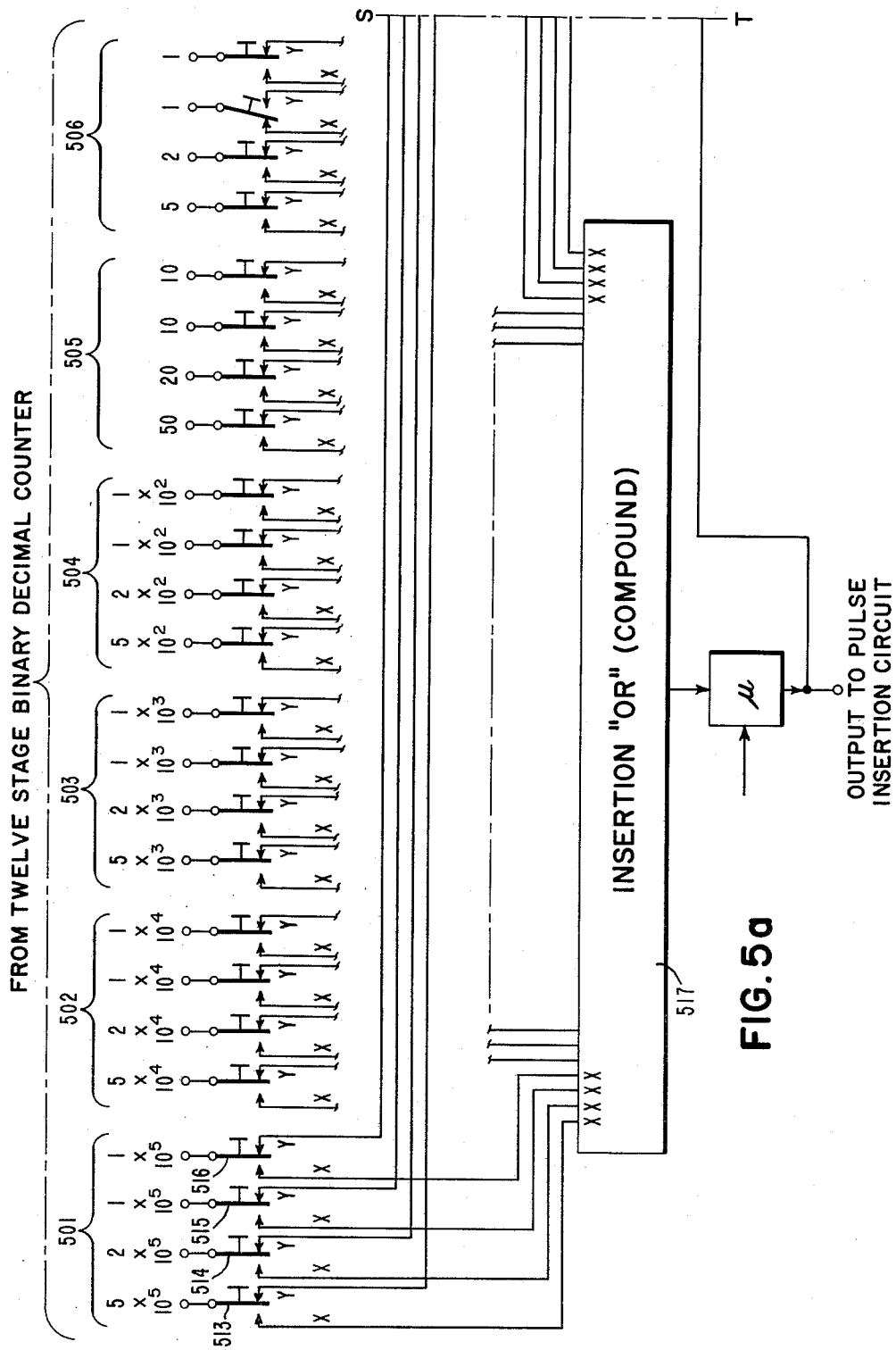
FIG. 5a shows a portion of the frequency ratio selector of the invention.
Figure 5B:
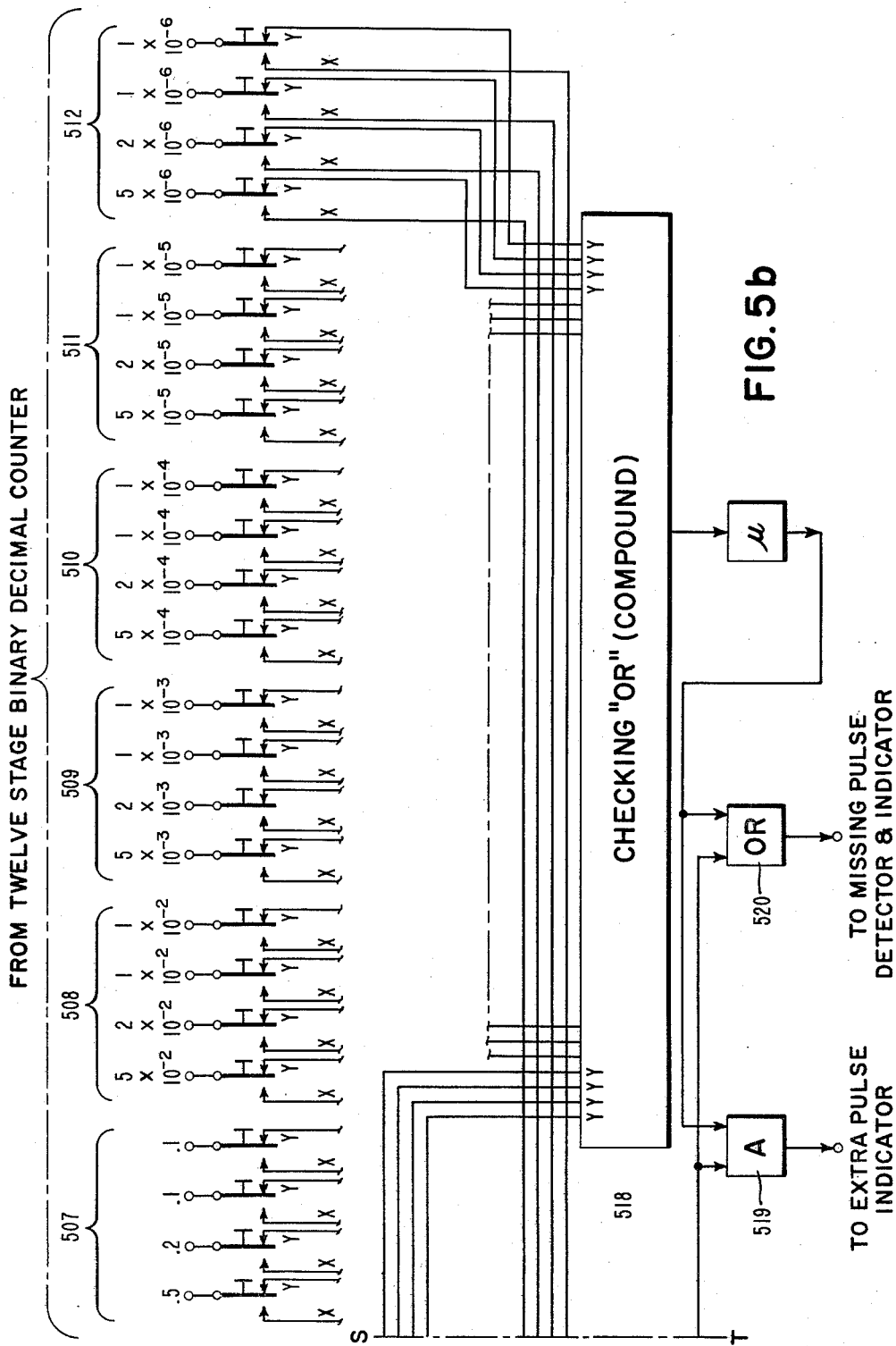
FIG. 5b shows the remainder of the frequency ratio selector of the invention.

Referring to FIGS. 5a and 5b, which together show the frequency ratio selector of the invention, there is shown a plurality of single-pole, double-throw switches to which each of the outputs of the 12-stage binary decimal counter are connected. The group of four switches designated generally by the numeral 501 are the switches to which four outputs of counter stage 1 are connected. Similarly, the numerals 502 through 512 each designate generally a group of four switches to which the four outputs of the correspondingly numbered counter stage are connected. Referring particularly to the group of four switches designated by the numeral 501 the first output of counter stage 1 is connected to a switch 513. If it is assumed that the input to the 12-stage binary decimal counter is $1,000 \times 10^6$ pulses per second, then the input to the switch 13 is $5 \times 10^5$ pulses per second. Similarly the input to a switch 14 is $2 \times 10^5$ pulses per second, the input to switch 15 is $1 \times 10^5$ pulses per second and the input to a switch 16 is $1 \times 10^5$ pulses per second.

The switch 13, for example, has two positions designated as X and Y. When the switch is in the X position the $5 \times 10^5$ pulses per second will be connected to an insertion OR circuit 517. When the switch 513 is in the Y position the $5 \times 10^5$ pulses per second are connected to a checking OR circuit 518. Both the insertion OR circuit 517 and the checking OR circuit 518 have an input from each of the single-pole, double-throw switches. Because of the large number of inputs to these circuits, they may be of the compound OR type, i.e., each set of four inputs may be connected to an OR circuit and each set of four OR circuits may be connected to another OR circuit and so on.

The switch 514 also has an X position and a Y position. When the switch 514 is given the X position the $2 \times 10^5$ pulses per second input is connected to the insertion OR circuit 517. When the switch 514 is in the Y position the $2 \times 10^5$ pulses per second input is connected to the checking OR circuit 518.

Similarly, all of the single-pole, double-throw switches have an X position and a Y position. The X position of each switch is connected to the insertion OR circuit 517 and the Y position of the switch is connected to the checking OR circuit 518 although these connections are shown for the groups of switches designated as 511 and 512. The output of the insertion OR circuit 517 is connected to the pulse insertion circuit of FIG. 1.

The operation of the frequency ratio selector is as follows: Let it be assumed that the output of the super high frequency divider of FIGURE 1, that is, the primary pulse source for the invention, is 971,278 pulses per second. In such a case it is desirable to insert 28,722 pulses per second into blank intervals in the pulse train. This number of pulses inserted into blank intervals in the pulse train would render a pulse train having an even $1,000 \times 10^6$ pulses per second. The frequency ratio selector of FIGURES 5a and 5b can be set so that it will produce an output of 28,722 pulses per second. In order to do this the second from the left-hand switch in the group of four designated 502, i.e. the switch to which $2 \times 10^4$ pulses per second are connected, is set to the X position. This connects $2 \times 10^4$ pulses per second to the insertion OR circuit. Similarly, the three left-hand switches of the group designated 503 are set to the X position. This will connect 5,000 pulses per second, 2,000 pulses per second and 1,000 pulses per second to the insertion OR circuit 517.

Similarly, the two left-hand switches of the group designated 504 are set to the X position. This connects 500 pulses per second and 200 pulses per second to the insertion OR circuit. The second from the left-hand switch of the group designated 505 is set to the X position. This connects 20 pulses per second to the insertion OR circuit. The two right-hand switches of the group designated 506 are set to the X position. These two switches each connect 1 pulse per second to the insertion OR circuit. It can be seen that with the single-pole, double-throw switches so set that 28,722 pulses per second are connected to the insertion OR circuit 517 and these pulses will appear as the output of that OR circuit as the secondary train.

In the example just described it was assumed that the frequency of the primary pulse train 971,278 pulses per second, was accurately known only to the units figure. It should be noted that where more significant figures of the primary pulse train frequency are known, the groups of switches designated 507 through 512 may be set so that the resultant output of the frequency ratio selector will be a number of pulses which, when inserted into the primary pulse train, are sufficient to render the pulse train a constant $1 \times 10^6$ pulses per second accurate to the number of significant figures to which the accuracy of the primary pulse train frequency is known. It is theoretically possible, by using all of the switches of the frequency ratio selector, that the $1.0 \times 10^6$ pulse per second output of the invention can be rendered accurate to 12 significant figures.

Because of the complex nature of the circuitry of the subject pulse generator, it is quite possible that a malfunction may occur. It is quite desirable that there be an indication of an error in the operation of the circuitry since such an error might not be noticed by the operator.

In order to provide a check on the accuracy of the operation of the circuitry of the invention we connect the checking OR circuit 518 to an extra pulse AND circuit 511 and to a missing pulse OR circuit 520. The purpose of the checking circuitry is to insure that there are no extra or overlapping pulses in the outputs of the 12-stage binary decimal counter and to insure that there are no pulses missing in the outputs of the binary decimal counter. Each output of the binary counter is connected through one of the single-pole, double-throw switches to either the insertion OR circuit 517 or the checking OR circuit 518. Thus, during each pulse interval either the insertion OR circuit 517 or the checking OR circuit 518 will produce an output. The outputs of both of these OR circuits are connected to the AND circuit 519 and to the OR circuit 520. Thus, if for any reason there is an error such that two pulses occur during one pulse interval, the AND circuit 519 will produce an output. This output can be detected by an extra pulse detector to indicate an error in operation. On the other hand, if for any reason there is a missing pulse in one of the pulse intervals, the absence of a pulse at the output of OR circuit 520 indicates that there is an error in operation. Such circuitry provides a convenient check on the operation of the pulse generator at little additional cost.

Pulse Insertion Circuit

The secondary pulse train produced as the output of the frequency ratio selector is connected to the pulse insertion circuit which is shown in FIG. 4.

Referring to FIG. 4, there is shown a first latch including an OR circuit 401, a delay circuit 402 and an AND circuit 406. This latch will recirculate a pulse which is applied to the input. The secondary pulse train containing the pulses to be inserted in the primary pulse train is connected to OR circuit 401. This input is designated as Input 2. Each pulse in this input recirculates in the first latch.

In order to insert pulses into the pulse train, a second latch is provided comprising an OR circuit 403, an AND circuit 404 and a delay circuit 405. The output of this second latch is connected to an OR circuit 407. Also connected to OR circuit 407 is the primary pulse train, designated Input 1. The output of the OR circuit 407 is a pulse train having the proper number of pulses inserted therein.

The operation of the pulse insertion circuit of FIG. 4 will be explained in conjunction with an example of operation thereof, making reference to the waveforms of FIG. 4b. Referring to FIG. 4b, it will be seen that there are fifty pulse intervals arbitrarily labelled pulse intervals 100 through 1010, pulse intervals 1011 through 1020, etc. It will be seen that the waveform or pulse train impressed on Input No. 1 of FIG. 4 has certain pulse intervals, namely, 1008, 1019, 1026, and 1045 during which a pulse is not present.

In the practicing of applicants' invention, it is desirable to insert pulses in certain of these pulse intervals. It will be appreciated that the particular blank pulse interval into which the pulse is inserted is unimportant, whereas the insertion of a predetermined number of pulses in the blank pulse intervals of the input pulse train in a given period of time will result in a pulse train having a constant pulse rate per time interval. This will appear more clearly from the overall discussion of applicant's illustrative embodiment of their invention.

Figure 4B:
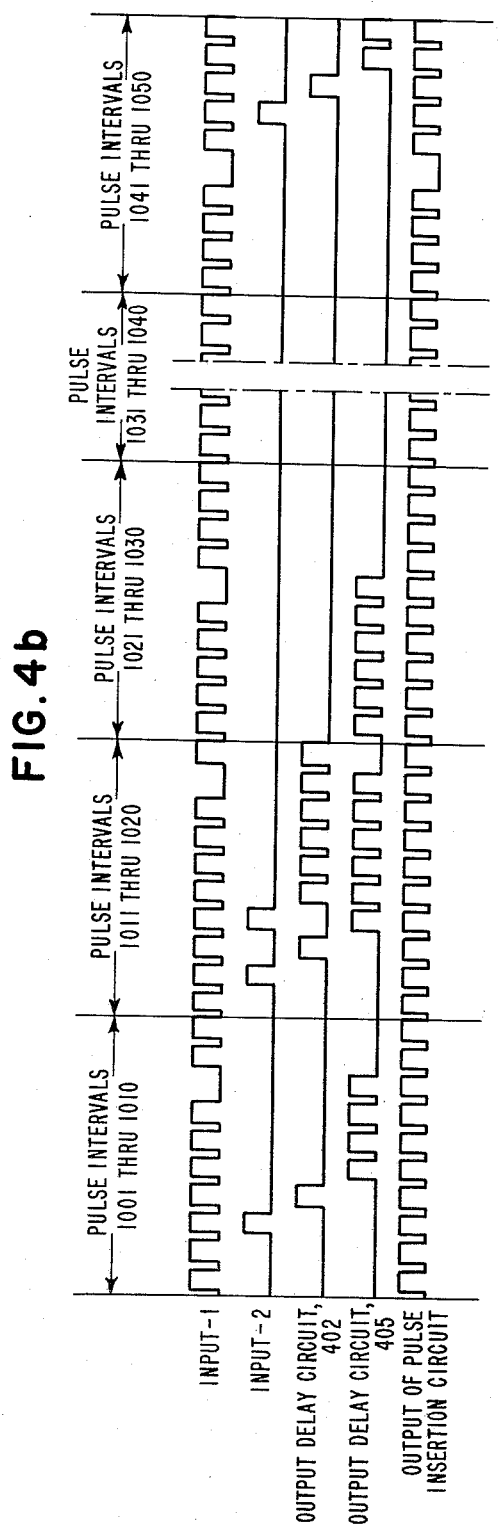
FIG. 4b shows waveform diagrams depicting the operation of the pulse insert circuit of the invention.

Now referring to FIGS. 4 and 4b, it will be seen that the input pulse of pulse interval 1000 is conveyed via OR circuit 407 to the output of the pulse insertion circuit. Similarly, the input pulses respectively occurring during pulse intervals 1000 through 1007 result in output pulses from the pulse insertion circuit corresponding to the pulses shown in pulse intervals 1000 through 1007 opposite the legend output of pulse insertion circuit.

Now referring to the waveform opposite Input No. 2 (FIG. 4b), it will be seen that during pulse interval 1003 an input pulse is impressed on Input No. 2 of the pulse insertion circuit. This input pulse will result in a corresponding pulse appearing as shown by the waveform labelled "Output Delay Circuit 402," at the output of delay circuit 402 during pulse interval 1004. This pulse will be impressed via OR circuit 403 on the right-hand input of AND circuit 404. From FIG. 4, it will be seen that the left-hand input of AND circuit 404 has a pulse impressed thereon during pulse interval 1004 since this input of AND circuit 404 is connected to Input No. 1 of the pulse insertion circuit. Thus during pulse interval 1005, the output of delay circuit 405 will manifest a pulse corresponding to the pulse impressed on Input No. 2 during pulse interval 1003.

From FIG. 4b and the waveforms corresponding to Input No. 1 and output of delay circuit 405, it will be seen that during pulse intervals 1005, 1006, and 1007, respectively, both inputs of AND circuit 404 will have a pulse impressed thereon. It will be seen that during pulse interval 1008 of Input No. 1 there is an absence of a pulse. Further, due to the coincidence, i.e., pulses at both inputs of AND circuit 404 during pulse interval 1007, the output of delay circuit 405 during pulse interval 1008 is conveyed via OR circuit 403 and OR circuit 407 to the output of the pulse insertion circuit. Thus, during pulse interval 1008 of the waveform labelled "Output of Pulse Insertion Circuit" there is a pulse present.

This pulse resulted from the pulse that was circulating in the latch consisting of OR circuits 403, AND circuit 404 and delay circuit 405 as a result of the input pulse during pulse interval 1003 impressed on Input No. 2 of the pulse insertion circuit. To summarize, the pulse insertion circuit of FIG. 4 has the capacity to store a pulse and will insert the stored pulse in the next occurring blank pulse interval of the pulse train impressed on Input No. 1.

Now referring to pulse intervals 1011 through 1020 of the waveforms of FIG. 4b, it will be seen that during pulse intervals 1011 through 1018 there is a pulse present at Input No. 1 that results in a corresponding pulse, during corresponding intervals, at the output of the pulse insertion circuit of FIG. 4. However, it will also be seen that during pulse interval 1012, a pulse to be inserted is impressed on Input No. 2 of the pulse insertion circuit. This pulse is conveyed via OR circuit 401, delay circuit 402, OR circuit 403, AND circuit 404 and impressed on the input of delay circuit 405. Thus, as seen from the waveform labelled "Output Delay Circuit 405," the pulse impressed on Input No. 2, during pulse interval 1012, will result in a pulse recirculating in the latch consisting of OR circuit 403, AND circuit 404 and delay circuit 405 during pulse intervals 1014 through 1019.

Further, during pulse interval 1014, a second pulse to be inserted is impressed on Input No. 2 of the pulse insertion circuit. This second pulse will circulate during pulse intervals 1015 through 1020 in a second latch consisting of OR circuit 401, delay circuit 402 and AND circuit 406. Prior to pulse interval 1019 and subsequent to the two pulses to be inserted during pulse intervals 1011 and 1020, there were no blank pulse intervals in the input. Hence, it was necessary to store these two pulses until a blank pulse interval occurred. This is accomplished by the afore-cited latches.

During pulse interval 1018 of the input pulses impressed on Input No. 1, there is a pulse present as well as a pulse circulating in each of the latches of the pulse insertion circuit. During pulse interval 1019 the pulse stored in the latch consisting of OR circuit 403, AND circuit 404 and delay circuit 405 is inserted via OR circuit 407 in the output of the pulse insertion circuit. During pulse interval 1020, the pulse circulating in the latch consisting of OR circuit 401, delay circuit 402 and AND circuit 406 is conveyed to the latch consisting of OR circuit 403, AND circuit 404 and delay circuit 405. That is, the pulse circulating in OR circuit 401, delay circuit 402 and AND circuit 406 is conveyed to the first or primary latch.

Thus during pulse intervals 1031 through 1036, a pulse will be circulating in the latch comprising OR circuit 403, AND circuit 404 and delay circuit 405. During blank interval 1036, this pulse will be inserted in the output of the pulse insertion circuit.

Referring to pulse intervals 1031 through 1050 no input pulses or pulses to be inserted are impressed on Input No. 2 until a time subsequent to blank pulse interval 1045. Thus blank pulse interval 1045 is reflected as a blank pulse interval during pulse interval 1045 in the output of the pulse insertion circuit of FIG. 4. The pulse to be inserted occurring during pulse interval 1047 will be stored in the primary latch until the next subsequent blank pulse interval.

It will be appreciated that in the illustrative embodiment of applicants' invention, there will be a greater number of pulse intervals per unit time than pulses per like unit time. That is, applicants' device renders a voltage constant number of pulses, $10^6$ per second at a pulse repitition rate of $1001^6$ pulse intervals per second.

While certain specific embodiments of our invention

What we claim as new and desire to secure by Letters Patent of United States is:

1. Electronic apparatus for converting a primary pulse train into a pulse train of a desired non-integral frequency of the frequency of the primary pulse train comprising means for producing a secondary pulse train of a frequency equal to the difference between the frequency of the primary pulse train and the desired frequency, and means for inserting the pulses of said secondary pulse train into said primary pulse train only in blank intervals in said primary pulse train whereby said primary pulse train is converted into a pulse train of the desired frequency.

2. Electronic apparatus for inserting a pulse train having a frequency of $Y_0$ pulses per second contained in a number of pulse intervals greater than $Y_0$ into a pulse train having a frequency of $A_0$ pulses per second comprising means for producing a secondary pulse train of a frequency equal to $A_0-Y_0$, means for inserting each of the pulses in said secondary train exclusively into blank pulse intervals in said primary pulse train whereby a pulse train having a frequency of $A_0$ pulses per second is produced.

3. Electronic apparatus for converting a primary pulse train into a pulse train of a desired non-integral frequency of the frequency of the primary pulse train comprising a binary decimal counter for producing a plurality of pulse outputs suitable for insertion into blank intervals in said primary pulse train, a frequency ratio selector, said plurality of pulse outputs being connected to said frequency ratio selector, said frequency ratio selector producing a pulse output of a frequency equal to the difference between the frequency of the primary pulse train and the desired frequency, a pulse insertion circuit, said secondary pulse train being connected to said pulse insertion circuit, said pulse insertion circuit including means for storing the pulses of the secondary pulse train until the occurrence of blank pulse intervals in the primary pulse train and means for inserting the pulses of the secondary pulse train into blank pulse intervals in said primary pulse train whereby a pulse train of the desired frequency is produced.

4. Electronic apparatus for converting a train of pulses having a number of pulse intervals greater than the number of pulses contained therein into a pulse train of a desired pulse frequency comprising a binary counter, said desired frequency pulse train being connected to the input of said binary counter, said binary counter producing a plurality of pulse outputs, each of said pulse outputs being of an integral multiple frequency of said desired frequency, a pulse insertion circuit, means for selectively connecting certain of said plurality of pulse outputs to said pulse insertion circuit, said primary pulse train being connected to said pulse insertion circuit, said pulse insertion circuit inserting each of the pulses contained in the pulse outputs connected to the pulse insertion circuit into a blank pulse interval in said primary pulse train whereby said primary pulse train is converted into a pulse train of the desired frequency.

5. Electronic apparatus for converting a primary pulse train into a pulse train of a desired non-integral frequency of the frequency of the primary pulse train comprising a plurality of binary counter stages, the output of each lower order binary counter stage being connected to the input of the succeeding higher order binary counter stage, said desired frequency pulse train being connected to the first of said series connected binary counter stages, each of said binary counter stages producing four pulse outputs, each of said pulse outputs being of an integral multiple frequency of the desired frequency, a plurality of single-pole, double-throw switches, each of said pulse outputs being connected to one of said switches, an insertion OR circuit, each of said switches being connected to said insertion OR circuit so that each of said pulse outputs can be selectively connected to said OR circuit, a pulse insertion circuit, said pulse insertion circuit including a first latch, said insertion OR circuit being connected to said first latch, said pulse insertion circuit further including a second latch, the output of said first latch being connected to the input of said second latch, a second OR circuit, said primary pulse train and the output of said second latch being connected to said OR circuit, the output of said OR circuit being a pulse train of the desired frequency.

6. The electronic apparatus recited in claim 5 and a checking OR circuit, each of said single-pole, double-throw switches being connected to said checking OR circuit, so that the input of each of said switches is selectively connected to either the insertion OR circuit or the checking OR circuit, a missing pulse OR circuit, said checking OR circuit and said insertion OR circuit being connected to said checking OR circuit whereby the output of said missing pulse OR circuit is indicative of the absence of a pulse in said desired frequency pulse train, an extra pulse AND circuit, said insertion OR circuit and said checking OR circuit being connected to said extra pulse AND circuit, so that the output of said extra pulse AND circuit is indicative of the presence of an extra pulse in said desired frequency pulse train.

7. The electronic appaartus recited in claim 5 wherein each binary counter stage comprises a 1-bit latch, a 2-bit latch, a 4 bit latch and an 8 bit latch, each of said latches having an energized condition and a de-energized condition, each of said latches being switched from one of said conditions to the other by the occurrence of a pulse input to that latch, each of said latches producing an output upon the occurrence of every other input pulse to that latch, the input to said binary counter stage being connected to said 1 bit latch, a first AND circuit connected between the input to said binary counter stage and said 2 bit latch, said 1 bit latch being connected to said first AND circuit, said first AND circuit switching said 2 bit latch to the energized condition upon the occurrence of an input pulse to the binary counter stage only when said 1 bit latch is energized, a second AND circuit connected between the input to said binary counter stage and said 4 bit latch, said 1 bit latch and said 2 bit latch being connected to said second AND circuit, said second AND circuit switching said 4 bit latch to the energized condition upon the occurrence of an input pulse to the binary counter stage only when both said 1 bit latch and said 2 bit latch are energized, a third AND circuit connected between the input to said binary counter stage and said 8 bit latch, said 1 bit latch, said 2 bit latch, and said 4 bit latch being connected to said third AND circuit, said third AND circuit switching said 8 bit latch to the energized condition upon the occurrence of an input pulse to the binary counter only when said 1 bit latch, said 2 bit latch and said 4 bit latch are energized, the output of said 1 bit latch, the output of said 2 bit latch, the output of said 4 bit latch and the output of said 8 bit latch being the four pulse outputs of each of said binary counter stages, a fourth AND circuit connected between each lower order counter stage and the succeeding higher order counter stage, said 1 bit latch and said 8 bit latch being connected to said fourth AND circuit whereby there is an input to the succeeding counter stage upon the occurrence of the ninth input pulse to the lower order stage, and means for resetting each of said counter stages upon the occurrence of the tenth input pulse to that counter stage, said last-named means including a fifth AND circuit, said input to said binary counter stage, said 1 bit latch and said 8 bit latch being connected to said fifth AND circuit, the output of said fifth AND circuit being connected to said 1 bit latch, said 2 bit latch, said 4 bit latch and said 8 bit latch whereby the latches are de-energized upon the occurrence of the tenth input pulse to that counter stage.

8. The electronic apparatus recited in claim 7 wherein each of the 1 bit, 2 bit, 4 bit, and 8 bit latches comprises an OR circuit, a first AND circuit and a delay circuit connected in a ring so that an input pulse is recirculated so long as said first AND circuit is energized, each of said latches further comprising a second AND circuit and an inverter for de-energizing said first AND circuit, the input to said latch and the output of said delay circuit being connected to said second AND circuit, the output of said second AND circuit being connected to said inverter, the output of said inverter being connected to said first AND circuit so that said first AND circuit is de-energized upon the occurrence of coincidence between a recirculating pulse and an input pulse, said latch further comprising a third AND circuit for producing an output upon the occurrence of alternate input pulses to said latch, said input pulses and the output of said inverter circuit being connected to said third AND circuit, the output of said third AND circuit being the output of said latch.

9. Electronic apparatus for converting a primary pulse train into a pulse train of a desired non-integral frequency of the frequency of the primary pulse train comprising a binary decimal counter for producing a plurality of pulse outputs suitable for insertion into blank intervals in said primary pulse train, a frequency ratio selector, said plurality of pulse outputs being connected to said frequency ratio selector, said frequency ratio selector producing an output of a frequency equal to the difference between the frequency of the primary pulse train and the desired frequency, a first OR circuit, a first delay circuit, and a first AND circuit connected in a ring to form a first latch, said difference frequency pulse train being connected to said first OR circuit so that each of the pulses in said last-named pulse train recirculates in said first latch until said first latch is de-energized, a second OR circuit, a second AND circuit and a second delay circuit connected in a ring to form a second latch, the output of said first delay circuit being connected to the input to said second OR circuit so that a pulse recirculating in said first latch is inserted into said second latch when there is no pulse recirculating therein, the output of said second delay circuit being connected to the input to said first AND circuit so that said first latch is de-energized when there is no pulse recirculating in said second latch, a third OR circuit, said primary pulse train being connected to said third OR circuit, the output of said second OR circuit being connected to the input to said third OR circuit whereby the output of said third OR circuit is the primary pulse train with the recirculating pulses of said second latch being inserted in blank intervals therein, said primary pulse train being connected to the input to said second AND circuit so that said second latch is de-energized upon the occurrence of a blank interval in the primary pulse train.

10. Electronic apparatus for converting a pulse train having a frequency of $Y_0$ pulses per second contained in a number of pulse intervals greater than $Y_0$ into a pulse train having a frequency of $A_0$ pulses per second comprising means for producing a secondary train of pulses of a frequency equal to $A_0-Y_0$, a first OR circuit, a first delay circuit and a first AND circuit connected in a ring to form a first latch, said secondary train of pulses being connected to said first OR circuit so that each of said pulses recirculates in said first latch until said first latch is de-energized, a second OR circuit, a second AND circuit and a second delay circuit connected in a ring to form a second latch, the output of said first delay circuit being connected to the input to said second OR circuit so that a pulse recirculating in said first latch is inserted into said second latch when there is no pulse recirculating therein, the output of said second delay circuit being connected to the input of said first AND circuit so that said first latch is de-energized when there is no pulse recirculating in said second latch, a third OR circuit, said primary pulse train and the output of said second OR circuit being connected to said third OR circuit whereby the output of said third OR circuit is the pulse train having the recirculating pulses of the second latch inserted into blank intervals therein, said primary pulse train being connected to said second AND circuit so that said second latch is de-energized upon the occurrence of a blank pulse interval in said primary pulse train.

11. Electronic apparatus for converting a train of pulses having a number of pulse intervals greater than the number of pulses contained therein into a pulse train of a desired pulse frequency comprising a binary counter, said desired frequency pulse train being connected to the input of said binary counter, said binary counter producing a plurality of pulse outputs, each of said pulse outputs being of an integral multiple frequency of said desired frequency, a pulse insertion circuit, said pulse insertion circuit including a first OR circuit, a first delay circuit and a first AND circuit connected in a ring to form a first latch, a second OR circuit, a second AND circuit and a second delay circuit connected in a ring to form a latch, means for combining selected pulse outputs of said binary counter to form a secondary pulse train, said secondary train of pulses being connected to said first OR circuit so that each of said pulses recirculates in said first latch until said first latch is de-energized, the output of said first delay circuit being connected to the input to said second OR circuit so that a pulse recirculating in said first latch is transferred to said second latch when there is no pulse recirculating therein, the output of said second delay circuit being connected to the input of said first AND circuit so that said first latch is de-energized when there is no pulse recirculating in said second latch, a third OR circuit, said primary train of pulses and the output of said second OR circuit being connected to said third OR circuit whereby the output of said third OR circuit is the primary train of pulses having the recirculating pulses of the second latch inserted in blank intervals therein, said primary train of pulses being connected to said second AND circuit so that said second latch is de-energized upon the occurrence of a blank pulse interval.

References Cited in the file of this patent

UNITED STATES PATENTS

| | | |
|---|---|---|
| 2,791,695 | Bareford et al. | May 7, 1957 |
| 2,827,566 | Lubkin | Mar. 18, 1958 |
| 2,923,891 | Nicholson | Feb. 2, 1960 |
| 2,926,242 | Feyzeau | Feb. 23, 1960 |